(12) United States Patent
Jadidian et al.

(10) Patent No.: US 12,710,812 B2
(45) Date of Patent: Aug. 18, 2026

(54) APPARATUS AND METHOD TO DETERMINE A POSE OF A HEAD MOUNTED DISPLAY

(71) Applicant: Rivet Industries, Inc., Washington, DC (US)

(72) Inventors: Jouya Jadidian, Los Gatos, CA (US); Seyedsohrab Madani, Menlo Park, CA (US); Mohit Narang, Cupertino, CA (US)

(73) Assignee: Rivet Industries, Inc., Washington, DC (US)

( * ) Notice: Subject to any disclaimer, the term of this patent is extended or adjusted under 35 U.S.C. 154(b) by 0 days.

(21) Appl. No.: 19/049,754

(22) Filed: Feb. 10, 2025

(65) Prior Publication Data

US 2025/0348133 A1 Nov. 13, 2025

Related U.S. Application Data

(60) Provisional application No. 63/656,248, filed on Jun. 5, 2024, provisional application No. 63/646,338, filed on May 13, 2024.

(51) Int. Cl.
*G06F 3/01* (2006.01)

(52) U.S. Cl.
CPC .................................... *G06F 3/012* (2013.01)

(58) Field of Classification Search
CPC ........ G06F 3/012; G06F 1/163; G02B 27/017
See application file for complete search history.

(56) References Cited

U.S. PATENT DOCUMENTS 9,459,692 B1 * 10/2016 Li ........................... G01S 5/163
2009/0202254 A1 8/2009 Majumdar et al.
2015/0294505 A1 * 10/2015 Atsmon .............. G06F 3/04815 345/633

(Continued)

FOREIGN PATENT DOCUMENTS

CN 110297325 A * 10/2019 ......... G02B 27/0172
JP 2000271342 A 10/2000

OTHER PUBLICATIONS

PCT Application No. PCT/US2025/029022, International Search Report and Written Opinion mailed Dec. 4, 2025; Applicant Rivet Industries, Inc.; 15 pages.

(Continued)

*Primary Examiner* — Temesghen Ghebretinsae
*Assistant Examiner* — Ivelisse Martinez Quiles
(74) *Attorney, Agent, or Firm* — COOLEY LLP

(57) ABSTRACT

A light generation device (LGD) includes an attachment configured to couple the LDG to a surface of an interior of a vehicle, a sensor configured to capture motion data of the LGD, a plurality of light projectors configured to generate a plurality of light patterns within the interior, a memory, and a processor operatively coupled to the sensor and the memory. The processor is configured to cause the plurality of light patterns to be generated within the interior via the plurality of light projectors, and send the motion data to a head mounted display (HMD) that determines a pose associated with the HMD after receiving the motion data based on at least one of the motion data or image data (1) that is captured by the HMD and (2) that includes a representation of at least some patterns from the plurality of light patterns.

20 Claims, 26 Drawing Sheets

(56) References Cited

U.S. PATENT DOCUMENTS

| | | | | |
|---|---|---|---|---|
| 2016/0189429 | A1* | 6/2016 | Mallinson | G02B 27/017 345/633 |
| 2016/0349509 | A1 | 12/2016 | Lanier et al. | |
| 2020/0041276 | A1 | 2/2020 | Chakravarty et al. | |
| 2021/0133932 | A1 | 5/2021 | Lee et al. | |
| 2021/0264213 | A1 | 8/2021 | Pandey et al. | |
| 2022/0189109 | A1 | 6/2022 | Panteleev | |
| 2022/0319047 | A1 | 10/2022 | Urtasun et al. | |
| 2023/0130478 | A1 | 4/2023 | Zhang et al. | |
| 2024/0040250 | A1 | 2/2024 | Shi et al. | |
| 2025/0349035 | A1 | 11/2025 | Madani et al. | |
| 2026/0063908 | A1* | 3/2026 | Jain | G02B 27/017 |

OTHER PUBLICATIONS

Dabiri, M. T et al., "Modulating Retroreflector Based Free Space Optical Link for UAV-to-Ground Communications," IEEE Transactions on Wireless Communications, [Epub Apr. 27, 2022]; (Oct. 2022), 21(10):8631-8645.

PCT Application No. PCT/US2025/029022, Invitation to Pay Additional fees mailed Oct. 13, 2025; Applicant Rivet Industries, Inc.; 12 pages.

* cited by examiner

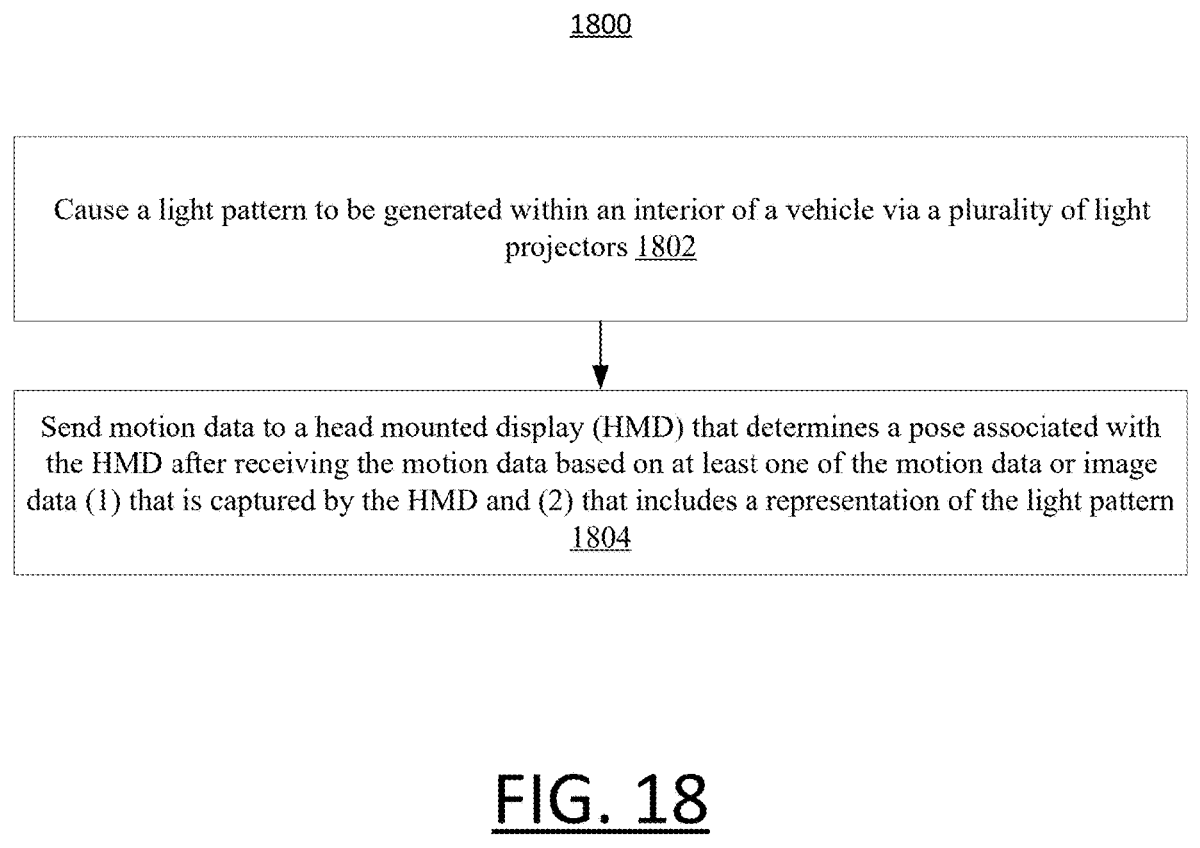

1800

Cause a light pattern to be generated within an interior of a vehicle via a plurality of light projectors 1802

Send motion data to a head mounted display (HMD) that determines a pose associated with the HMD after receiving the motion data based on at least one of the motion data or image data (1) that is captured by the HMD and (2) that includes a representation of the light pattern 1804

FIG. 18

APPARATUS AND METHOD TO DETERMINE A POSE OF A HEAD MOUNTED DISPLAY

CROSS REFERENCES TO RELATED APPLICATIONS

This application claims priority to U.S. Provisional Patent Application No. 63/646,338, filed May 13, 2024 and titled "SIX-DEGREES-OF-FREEDOM ALGORITHM WITH LOW QUALITY AND SPARSE SIGNALS IN A NEAR INFRARED (IR) MONOCHROME COMPUTER VISION SYSTEM OF A HEAD MOUNTED DISPLAY," and U.S. Provisional Patent Application No. 63/656,248, filed Jun. 5, 2024 and titled "SIX-DEGREES-OF-FREEDOM HEAD TRACKING INSIDE VEHICLES WITH VIEWS OR OPENINGS TO AN EXTERNAL ENVIRONMENT," the contents of each of which are incorporated by reference herein in their entirety.

FIELD

The present disclosure generally relates to imaging, and more specifically to systems, devices, and methods for supporting six-degrees-of-freedom (6DOF) algorithms in low quality and sparse signal environments. Some embodiments generally relate to systems, devices, and methods for supporting 6DOF head tracking algorithms inside vehicles with windows. Some embodiments, systems, devices, and methods described herein can be used with a near infrared (IR) monochrome computer vision system of a head mounted display (HMD).

BACKGROUND

An HMD can be used, for example, for a virtual reality (VR), mixed reality (MR), or augmented reality (AR) experience. More specifically, an HMD can track three-dimensional (3D) position and rotation to provide a virtual or mixed environment for a user. A 6DOF algorithm can be used for such tracking. The 6DOF algorithm can be based on near-IR monochrome computer vision in conjunction with inertial measurements. Such an 6DOF algorithm, however, can have poor performance in challenging environments, which can disrupt head tracking, consequently interrupting a MR or AR experience. This can occur with conditions such as, for example, low light spaces, featureless spaces and/or vehicle movements that have unpredictable nature and/or high acceleration. Heading tracking can be particularly challenging in vehicles with windows or sunroofs (e.g., a view of the outside from glass windows) and/or openings that provide a direct light of sight of outdoors.

Thus, a need exists to improve tracking related to 6DOF algorithms for an HMD configured to provide an MR or AR experience.

SUMMARY

In an embodiment, a head mounted display (HMD) includes a first sensor configured to capture motion data associated with the HMD when the HMD is worn by a user. The HMD further includes a second sensor configured to capture image data that includes a representation of light patterns generated by a light generation device. The HMD further includes a memory. The HMD further includes a processor operatively coupled to the first sensor, the second sensor, and the memory. The processor is configured to receive motion data associated with the light generation device. The processor is further configured to determine whether at least one of the motion data associated with the HMD or the motion data associated with the light generation device has noise outside a predetermined acceptable range. The processor is further configured to, in response to determining that the at least one of the motion data associated with the HMD or the motion data associated with the light generation device has noise outside the predetermined acceptable range, determine a head pose of the user (1) based on the image data, (2) not based on the motion data associated with the HMD and (3) not based on the motion data associated with the light generation device. The processor is further configured to, in response to determining that the at least one of the motion data associated with the HMD or the motion data associated with the light generation device has noise within the predetermined acceptable range, determine the head pose of the user based on the image data, the motion data associated with the HMD, and the motion data associated with the light generation device.

In an embodiment, a method includes capturing, during a time period, motion data of a head mounted display (HMD). The method further includes receiving, from a light generation device, motion data of the light generation device during the time period. The method further includes capturing, during the time period, image data that includes a representation of a light pattern generated by the light generation device. The method further includes determining that a characteristic of at least one of the motion data of the HMD or the motion data of the light generation device is outside a predetermined acceptable range. The method further includes, in response to determining that the characteristic of at least one of the motion data of the HMD or the motion data of the light generation device is outside the predetermined acceptable range, determining a pose associated with the HMD (1) based on the image data, (2) not based on the motion data of the HMD and (3) not based on the motion data of the light generation device.

In an embodiment, a light generation device includes an attachment configured to couple the light generation device to a surface of an interior of a vehicle. The light generation device further includes a sensor configured to capture motion data of the light generation device. The light generation device further includes a plurality of light projectors configured to generate a light pattern within the interior of the vehicle. The light generation device further includes a memory. The light generation device further includes a processor operatively coupled to the sensor and the memory. The processor is configured to cause the light pattern to be generated within the interior of the vehicle via the plurality of light projectors. The processor is further configured to send the motion data to a head mounted display (HMD) that determines a pose associated with the HMD after receiving the motion data based on at least one of the motion data or image data (1) that is captured by the HMD and (2) that includes a representation of the light pattern.

BRIEF DESCRIPTION OF THE DRAWINGS

FIG. 18 illustrates a flowchart of a method to generate a light pattern and capture motion data, according to an embodiment.

DETAILED DESCRIPTION

Systems, devices, and methods described herein relate to tracking a head pose or head movements of a user in low light, featureless and/or unpredictable environments. In some embodiments, systems, devices, and methods described herein track the head pose of a user wearing a head mounted display (HMD). It can be difficult for known systems to track the head pose of a user when an environment or scene has low light, is featureless, and/or unpredictable. Such environments can include, for example, being in a moving transport (e.g., a vehicle, plane, etc.), being in snowy environment, or being in a less-than-one-lux environment.

In one or more embodiments, a device can illuminate surfaces in line of sight with infrared and/or visible features, and provide an anchor for computer vision algorithms to be stable even under extreme low light situations or featureless situations. When the device is located on a vehicle (e.g., coupled to the chassis of the vehicle), the inertial measurement unit (IMU) of the device can constantly or repeatedly stream its readings back to one or more headsets (e.g., HMDs) to allow the six degrees of freedom (6DOF) algorithm to determine changes of speed in six directions to distinguish vehicle acceleration/momentums from movements of the head of the user.

In spaces (e.g., vehicles) with windows that provide views of the outside environments, or spaces with or without ceilings that provide a direct line of sight to the outside environments, it may be challenging for a computer vision system of an HMD to distinguish between features outside of the space and features within the space. As such, systems, devices, and methods described herein may include optical elements that can be adjusted to redirect light, thereby controlling a direction in which features are captured by the 6DOF sensors of the HMD.

Some implementations are related to determining a pose of a HMD and/or user wearing the HMD in an environment that is substantially featureless, low light, and/or unpredictable. For example, the user may be riding in a vehicle and the vehicle can be in an environment that is substantially featureless, low light, and/or unpredictable. Substantially featureless can refer to, for example, an environment that lacks distinctive or noticeable characteristics, elements, or features; for example, an environment that is substantially featureless may have low spatial complexity (e.g., number of physical features is low), the range of spectral diversity is low, entropy is high, and/or the like. Low light can refer to, for example, less than one lux. Unpredictability can refer to, for example, the environment having sharp paths, uneven surfaces, and/or the like; additionally or alternatively, unpredictability can refer to a vehicle making abrupt movements (e.g., sudden accelerations).

Figure 1:
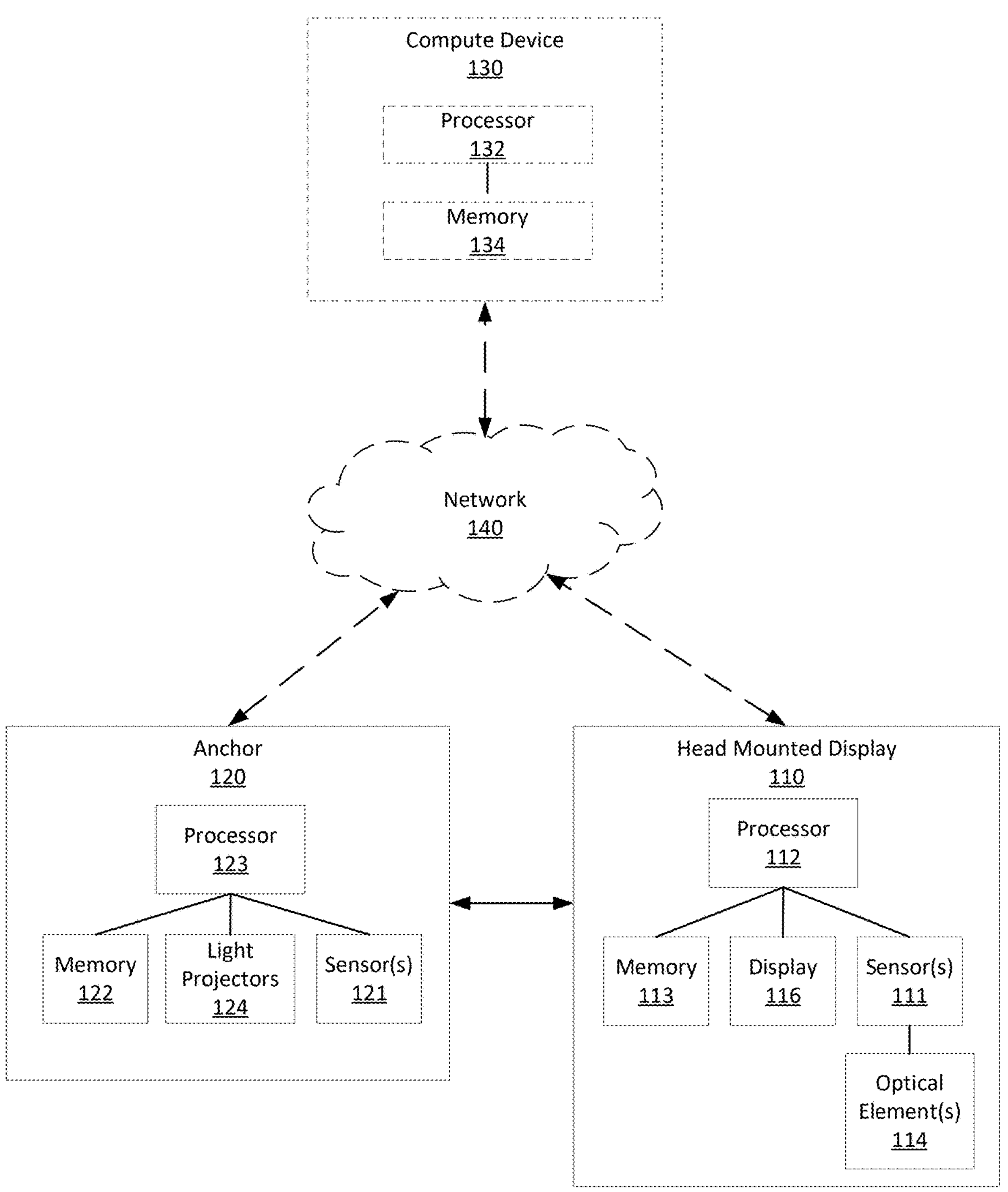
FIG. 1 is a block diagram of a system including an HMD and an anchor device, according to some embodiments.

FIG. 1 is a block diagram of a system of devices for tracking a head pose of a user, according to an embodiment. As shown in FIG. 1, the system includes a head mounted display (HMD) 110 and an anchor 120 (sometimes referred to herein as a "light generation device"), which are connected to one another (e.g., wired or wireless). Optionally, the system can also include one or more other devices, such as one or more compute devices 130, which can be coupled with the HMD 110 and the anchor 120 via a communications network 140.

The HMD 110 can be, for example, a display device, worn on the head or as part of a helmet that has a small display optic in front of one eye or each eye. In some embodiments, the HMD 110 is a virtual reality (VR) headset that tracks three-dimensional (3D) position and rotation to provide a virtual environment to the user. Such a virtual reality headset of HMD 110 can be a three-degree of freedom (3DOF) VR headset for example having an inertial measurement unit (IMU) or a 6DOF VR headset for example using sensor fusion from multiple sensors/data sources including at least one IMU. Such an IMU and/or multiple sensors are shown in FIG. 1 as sensor(s) 111 of HMD 110. In addition to an IMU, sensor(s) 111 can include for example an accelerometer, a gyroscope, a camera, a red-green-blue (RGB) camera, a low light camera, a thermal imager, a WiFi® sensor (e.g., a WiFi® receiver or a WiFi® transceiver), a radar sensor, a magnetometer, etc. In some embodiments, the HMD 110 is an AR or MR device, such as a headset, glasses, goggles, etc. Similar to the VR headset, the AR or MR device can include one or more sensor(s) 111 that can track information regarding the user and/or an environment surrounding the user.

In some embodiments, the sensor(s) 111 can include imaging devices, such as, for example, an optical or infrared camera. In some embodiments, the imaging device can be a low light imaging camera (e.g., that uses high-sensitivity image sensors, that has larger sensors and/or individual pixels, have wider aperture lens like f/1.2 or f/1.4, etc.). The imaging devices can capture an environment around a user of the HMD. For example, the imaging devices can capture an image feed or image data of a scene or environment around a user wearing the HMD 110.

In some embodiments, HMD 110 includes optical element(s) 114, which can be positioned in front of sensor(s) 111, such as a camera or other imaging device. The optical element(s) 114 can be configured to alter a line of sight or field of view of the camera. For example, the optical element(s) 114 can be positioned in the line of sight of the camera and be configured to bend or redirect light to alter the field of view of the camera. The optical element(s) 114 can be configured to alter the field of view of the camera depending on the position or orientation of the optical element(s) 114. In some embodiments, each optical element 114 can be configured to be adjusted in at least one degree of freedom (e.g., rotated about an axis) to refract or redirect light in a different direction. For example, an optical element 114 can be rotatable about an axis corresponding to the line of sight of the camera. In some embodiments, the optical element 114 can be rotated by about 45 degrees, about 90 degrees, about 135 degrees, or about 180 degrees. In some embodiments, the optical element 114 can be set to different positions or orientations to change the field of view of the camera. In the case of a vehicle or moving transport, cameras on HMDs can be configured to capture a scene or surface to a left side, to a right side, to a bottom side (e.g., floor), and/or to a top side (e.g., ceiling) of the vehicle (or anything therebetween), depending on the position or orientation of the optical element(s) 114. In some embodiments, recalibration of the HMD 110 (including its sensors and/or other components) is not necessary to operate the device with the optical element(s) 114. For example, an HMD 110 via its cameras can be configured to capture image data without the need for recalibration, after the optical element(s) 114 have been added and/or adjusted. In some embodiments, multiple cameras with independently adjustable optical element(s) 114 can be used to capture surfaces in multiple directions relative to the HMD 110. For example, two optical elements 114 can be set to different positions or orientations, to cause different cameras to capture different surfaces. In some implementations, the optical element(s) 114 can include one or more multi-faceted prisms. In some implementations, the optical element(s) 114 can be adjustable by a user, e.g., by using their hands to manually rotate or move the optical elements 114 into set positions or orientations. Alternatively, or additionally, the optical element(s) 114 can be automatically adjusted, e.g., by a processor (e.g., processor 112) of the HMD 110. For example, the processor can be configured to automatically adjust the optical element(s) 114 based on determining that a surface being captured by the camera is not opaque and/or has a view of the outside. In some embodiments, the optical element(s) 114 can be removable from the HMD 110, to enable a user to attach and/or detach the optical element(s) 114 when desired. For example, the optical element(s) 114 can be configured to be magnetically coupled to or mechanically fastened to the HMD 110, and be removable when desired. The optical element(s) 114 can be primarily removed from the HMD 110, and added to the HMD 110 when needed (e.g., when windows or other openings are present in a vehicle). In some embodiments, the user can be provided a protocol or instructions on a predefined order for rotating the optical element(s) 114 (e.g., first lap, then ceiling, then walls, etc.) until a predefined or desirable performance is achieved. Such a protocol or instructions can assume that the user is stable and situated in a predefined position (e.g., sitting upright within a vehicle). In some implementations, different protocols or instructions may be provided to a user, depending on one or more conditions of the user and/or the environment in which the user is situated in (e.g., whether the user is sitting, standing, laying sideways, etc., and/or where openings or windows may be located in a vehicle).

In some implementations, optical element(s) 114 includes a mirror(s) configured to reflect light (e.g., from a scene to a camera, from a scene away from the camera, etc.). In some implementations, the mirror(s) can be oriented in a way such that light from an opaque surface is received at a camera of HMD 110 while light from all other surfaces and/or non-opaque surfaces is not received at the camera of HMD 110.

The cameras or other imaging devices, when the HMD 110 is equipped with optical elements 114, can be configured to capture features (e.g., generated by the anchor 120, as described below) on known opaque surfaces (e.g., and not non-opaque surfaces). In a vehicle or other moving transport, such surfaces can include surfaces without windows or openings to an outside high-feature environment. This can facilitate more effective and accurate determination of head poses of users within the vehicle. The captured surfaces can include, for example, light patterns generated by anchor 120 via light projectors 124.

HMD 110 can also include a processor 112, a memory 113, a display 116, and a communications interface (not shown). Processor 112 can be coupled to sensors 111, memory 113, display 116, and the communications interface. The processor 112 (e.g., a central processing unit (CPU), a graphics processing unit (GPU), and/or the like) can be, for example, a hardware-based integrated circuit (IC) or any other suitable processing device configured to run or execute a set of instructions or codes. In some embodiments, the processor 112 can execute instructions stored in memory 113 to perform one or more processes and/or functions, including processing sensor data (e.g., IMU data), determining a head pose of a user wearing the HMD 110, etc. An example of determining a head pose of a user is described below with reference to FIG. 3. The memory 113 (e.g., a random-access memory (RAM), a hard drive, a flash drive, and/or the like) of HMD 110 can store data, and/or code that includes instructions to cause the processor 112 to perform one or more processes or functions. The communication interface (e.g., a network interface card (NIC), a Wi-Fi® transceiver, a Bluetooth® transceiver, and/or the like) can be a hardware component that facilitates data communication between HMD 110 and other devices (e.g., the anchor 120, the compute device 130, compute devices coupled to communications network 140 but not shown in FIG. 1, and/or the like).

The anchor 120 can be, for example, a compute device, configured to be anchored or rigidly attached to a car, a plane, or other moving transport. The anchor 120 can include an attachment mechanism, e.g., on a bottom, top, and/or side of the device, which is configured to attach to a surface of the moving transport. The anchor 120 can include a memory 122, a processor 123 and a communications interface (not shown). Memory 122, processor 123 and the communications interface of compute device 120 can be similar to the memory 113, processor 112 and the communications interface of HMD 110.

Additionally, the anchor 120 can include light projectors 124 and sensor(s) 121. The sensor(s) 121 can include an IMU configured to measure information indicative of motion, such as, for example, acceleration, specific force, angular rate, etc. In addition to an IMU, the sensor(s) 121 can include for example an accelerometer, a gyroscope, a camera, a thermal imager, a WiFi® sensor (e.g., a WiFi® receiver or a WiFi® transceiver), a radar sensor, a magnetometer, etc. The light projectors 124 can be configured to project one or more light patterns on nearby surfaces, e.g., surfaces or walls within a car, plane, or other moving transport, or surfaces in a low light or featureless environment. In some implementations, the light projectors 124 can include laser diodes, vertical-cavity surface-emitting lasers (VCSELs), diffractive optical elements (DOE), or infrared lights. The light projectors 124 can be configured to project the light patterns in multiple directions and/or onto multiple surfaces. For example, the light projectors 124 can be installed on a top side and a bottom side of the anchor 120 (and/or lateral sides of the anchor 120), such that the light projectors 124 can project light upwards, downwards and/or in other directions. The light generated by light projectors 124 can project onto opaque and/or non-opaque surfaces. When used to facilitate the determination of head pose with one or more HMDs, the anchor 120 can be configured to project light patterns that are captured by one or more imaging devices of the HMDs. The light patterns can be captured by, for example, the imaging devices in low light, featureless, and/or unpredictable conditions, to enable determination of the head poses of users wearing the HMDs. For example, the light patterns can provide sufficient visible and/or non-visible features and/or light, which can be captured by the imaging devices and processed to determine the head poses of the users. In some implementations, given that the imaging devices are capturing image data including known patterns, a processor (e.g., processor 112 or processor 123) can be configured to determine the head poses of the users based on image data at about 45 frames per second or less. In some implementations, the processor can also be configured to process the image data including the known patterns faster than processing images not including the known patterns.

In some implementations, the anchor 120 can be a portable device, such as, for example, in the form factor of a puck or a mushroom. In some embodiments, the anchor 120 can be configured to connect directly to the HMD 110, e.g., without the communications network 130. For example, the anchor 120 can connect directly via a wireless connection to the HMD 110. The anchor 120 can be configured, via its communications interface (not shown), to directly send information to the HMD 110. For example, the anchor 120 can be configured to send IMU data (e.g., a 6DOF vector) to the HMD 110, such that the HMD 110, via processor 112, can be configured to determine a head pose of the user wearing the HMD 110. The anchor 120 can be configured to send the IMU data sporadically (e.g., when a pose of anchor 120 changes), repeatedly, or continuously, e.g., multiple times a minute, every minute, or every few minutes, etc.

While the anchor 120 is shown connected to a single HMD 110 in FIG. 1, it can be appreciated that the anchor 120 can be connected to more than one HMD 110. For example, in a moving transport including multiple users that are wearing HMDs 110, the anchor 120 can be configured to connect (e.g., wired or wirelessly) with each of the HMDs 110, such that the anchor 120 can share its IMU data with each of the HMDs 110.

Optionally, the anchor 120 and/or HMD 110 can be coupled to one or more additional compute devices 130, e.g., directly or via network 140. The compute device(s) 130 can include, for example, a memory 134, a processor 132 and a communications interface (not shown). Memory 134, processor 132 and the communications interface of compute device 130 can be similar to the memory 113, processor 112 and the communications interface of HMD 110.

In some implementations, techniques described herein determine a pose of an HMD/user wearing the HMD. In response to determining a pose of the HMD, one or more actions can occur. For example, a virtual reality (VR) and/or augmented reality (AR) scene can be generated or updated based on the pose to match the user's viewpoint, render objects to correctly appear in front of or behind real-world object in VR and/or AR, and/or the like. As another example, a gaze of the user can be predicted based on the pose to select virtual objects, track gestures, and/or the like. As another example, the directionality and/or intensity of audio at the HMD can be adjusted based on the pose to reflect the direction sound is actually coming from.

The communications network 140 can be, for example, any suitable communications network for transferring data, operating over public and/or private communications networks. For example, the communications network 140 can include a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, the communications network 140 can be a wireless network such as, for example, a Wi-Fi or wireless local area network ("WLAN"), a wireless wide area network ("WWAN"), and/or a cellular network. In other instances, the communications network 140 can be a wired network such as, for example, an Ethernet network, a digital subscription line ("DSL") network, a broadband network, and/or a fiber-optic network. The communications sent via the communications network 140 can be encrypted or unencrypted. In some instances, the communications network 140 can include multiple networks or subnetworks operatively coupled to one another by, for example, network bridges, routers, switches, gateways and/or the like.

Figure 2:
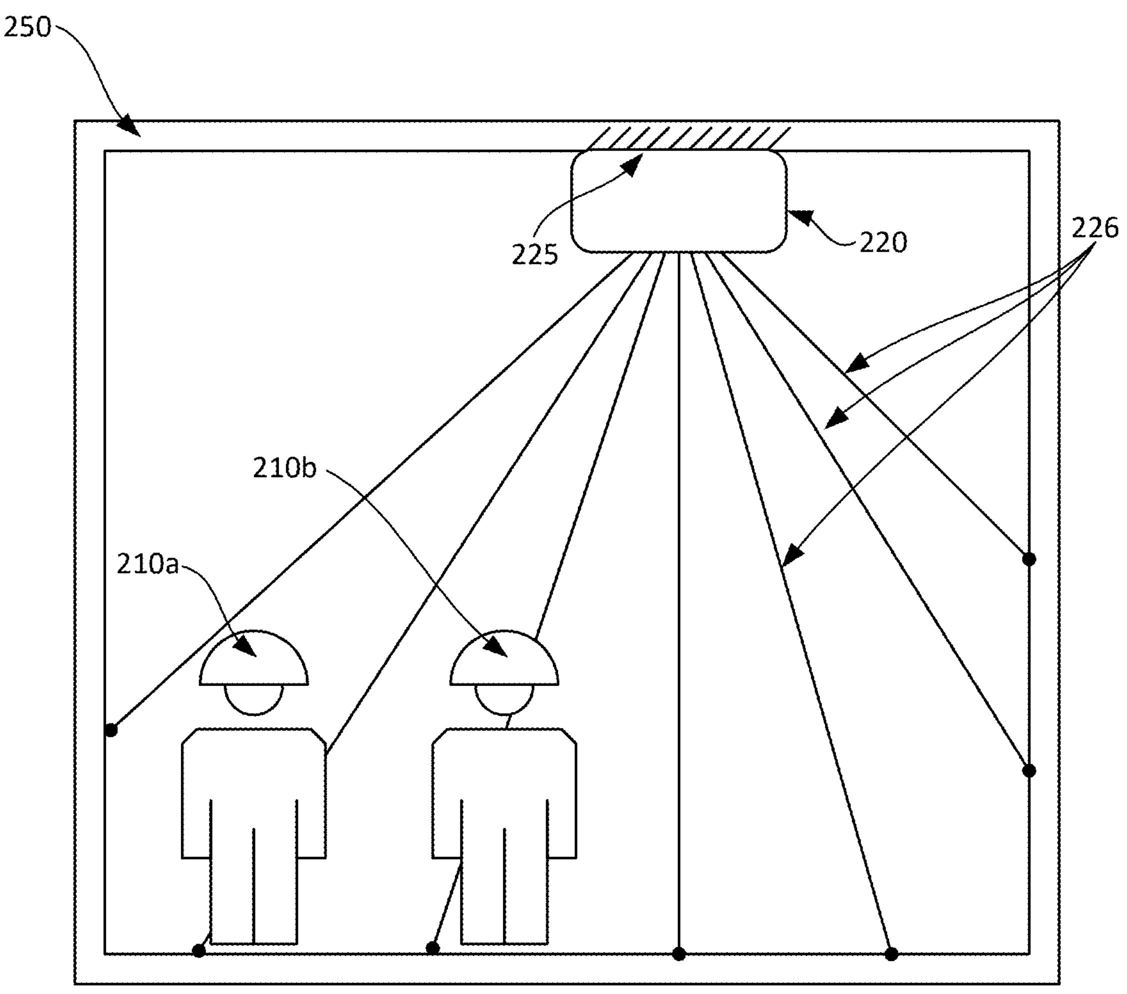
FIG. 2 schematically depicts generation of a visual pattern in an enclosed space for tracking head movement, according to some embodiments.

FIG. 2 schematically depicts an example scene, including a moving transport 250 and users wearing HMDs **210*a*, 210*b* within the moving transport 250, according to embodiments. As shown, the moving transport 250 can have multiple walls. The HMDs 210*a*, 210*b* can be structurally and/or functionally similar to the HMD 110 described with reference to FIG. 1. An anchor device 220 can be attached to a ceiling of the moving transport. The anchor 220 can be structurally and/or functionally similar to the anchor 120 described with reference to FIG. 1. The anchor device can include an attachment mechanism 225, such as, for example, a mechanical latch, clamp, fastener, or other component, a magnet, and/or an adhesive. As described above, the anchor 220 can include one or more light projectors (e.g., light projectors 124), which can be configured to project light 226 in multiple directions (e.g., to multiple different surfaces or walls) within the moving transport 250. The projected light 226 can be configured to form patterns on the walls of the moving transports, which can be captured by cameras on the HMDs 210***a*, 210*b*. The HMDs 210*a*, 210*b*, via their onboard processors (e.g., processor 123) and/or in communication with a processor (e.g., processor 132 of nearby or remote compute device), can then determine the head poses of the users based on the images captured by the cameras.

In some implementations, the anchor 220 also includes sensors (e.g., an IMU) that can capture information regarding the movement of itself, and therefore the transport 250 (which the anchor 220 is rigidly attached to). The anchor 220 can send this information (e.g., wirelessly or wired) to the HMDs 210*a*, 210*b* of the users located within the transport 250. Each HMD 210*a*, 210*b* can then determine the head pose of its respective user, based on the IMU data from the anchor 220 in combination with IMU data or other motion data captured at the HMD 210*a*, 210*b*. In some implementations, such as where users are within a compact space (e.g., a vehicle) anchor 220 can communicate with HMDs 210*a*, 210*b* using Bluetooth®, radio frequency identification (RFID), and/or any other short range wireless communication protocol that doesn't rely on Wi-Fi or a satellite connection. Being able to communicate without relying on a Wi-Fi® or satellite connection can be desirable in, for example, a military operation where soldiers are located in remote locations or enemy territory.

Figure 3:
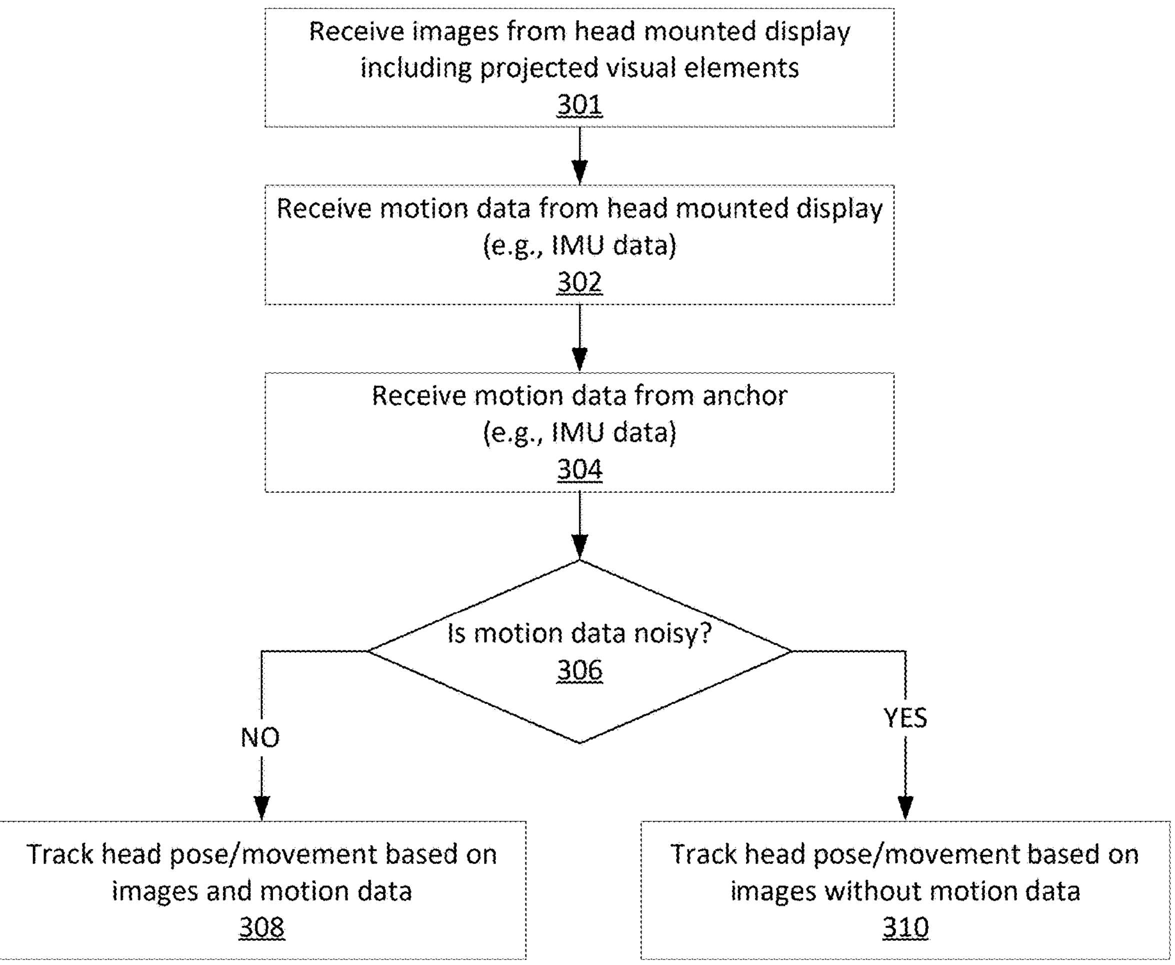
FIG. 3 is a flow chart of a method for tracking head movement, according to some embodiments.

FIG. 3 depicts a flow chart of an example method 300 for tracking head movement, according to some embodiments. The method 300 can be executed or implemented by a processor (or multiple processors), such as, for example, the processor 112 of the HMD 110 and/or the processor 123 of anchor 120. In a low-light, featureless, and/or unpredictable environment, an anchor, such as, for example, anchor 120 or 220, can be attached to fixture or wall and be configured to project light patterns onto surfaces in a scene.

At 301, the processor can receive images, such as, for example, images including the projected light patterns or other features made detectable by the projected light patterns. In some implementations, the images can be sequential frames of an image feed. In some implementations, the images can be captured by one or more imaging devices on an HMD being worn by a user.

At 302, the processor can receive motion data (e.g., IMU data, 6DOF vector) from an HMD being worn by a user. As described above, an HMD (e.g., HMD 110) can include an IMU, which can provide 6DOF data of a user's head. Additionally, or alternatively, other motion data, such as accelerometer data, gyroscope data, etc. can be provided.

At 304, the processor can receive motion data (e.g., IMU data, 6DOF vector) from the anchor. As described above, the anchor (e.g., anchor 120, 220) can include an IMU, which can provide 6DOF data indicative of the anchor's position, orientation, and movement.

At 306, the processor can assess the motion data provided by the HMD and/or the anchor. If the motion data provided by the HMD and/or the anchor is noisy or harsh (306: YES), then the processor may discard or ignore the motion data provided by the HMD and/or the anchor. At 310, the processor can then determine a head pose of the user wearing the HMD based on the images received at 301, e.g., using a visual tracking algorithm. If the motion data provided by the HMD and/or the anchor is not noisy or harsh (306: NO), then the processor, at 308, may determine the head pose of the user wearing the HMD based on the images received at 301 and the motion data. In some implementations, the motion data captured by the anchor and the HMD can be synchronized. In such implementations, the processor can modify the motion data of the HMD based on the motion data of the anchor, and then use the modified motion data in a tracking algorithm to determine the user's head pose. For example, the processor can subtract a 6DOF vector received from the anchor from the 6DOF vector of the HMD, to arrive at a 6DOF vector that excludes motion caused by movements external to the user (e.g., by a moving vehicle). Alternatively, in some implementations, the processor may use unsynchronized motion data from the anchor and the HMD, e.g., to detect moving scenarios and to turn off one or more sensors (e.g., IMUs, accelerometers, etc.) or change the use of the IMU data, for determining the head pose of the user.

In some implementations, systems, devices, and methods described herein can be configured to operate in moving vehicles or other transports that include windows. In such implementations, the anchor (e.g., anchor 120, 220), when attached to the vehicle, can be configured to project light onto a floor or lower portions of the vehicle interior. A processor (e.g., the processor 112 of the HMD 110 and/or the processor 123 of anchor 120) can then capture images of the floor or lower portions of the vehicle interior, and use those images to determine a head pose of users wearing an HMD.

Figure 4:
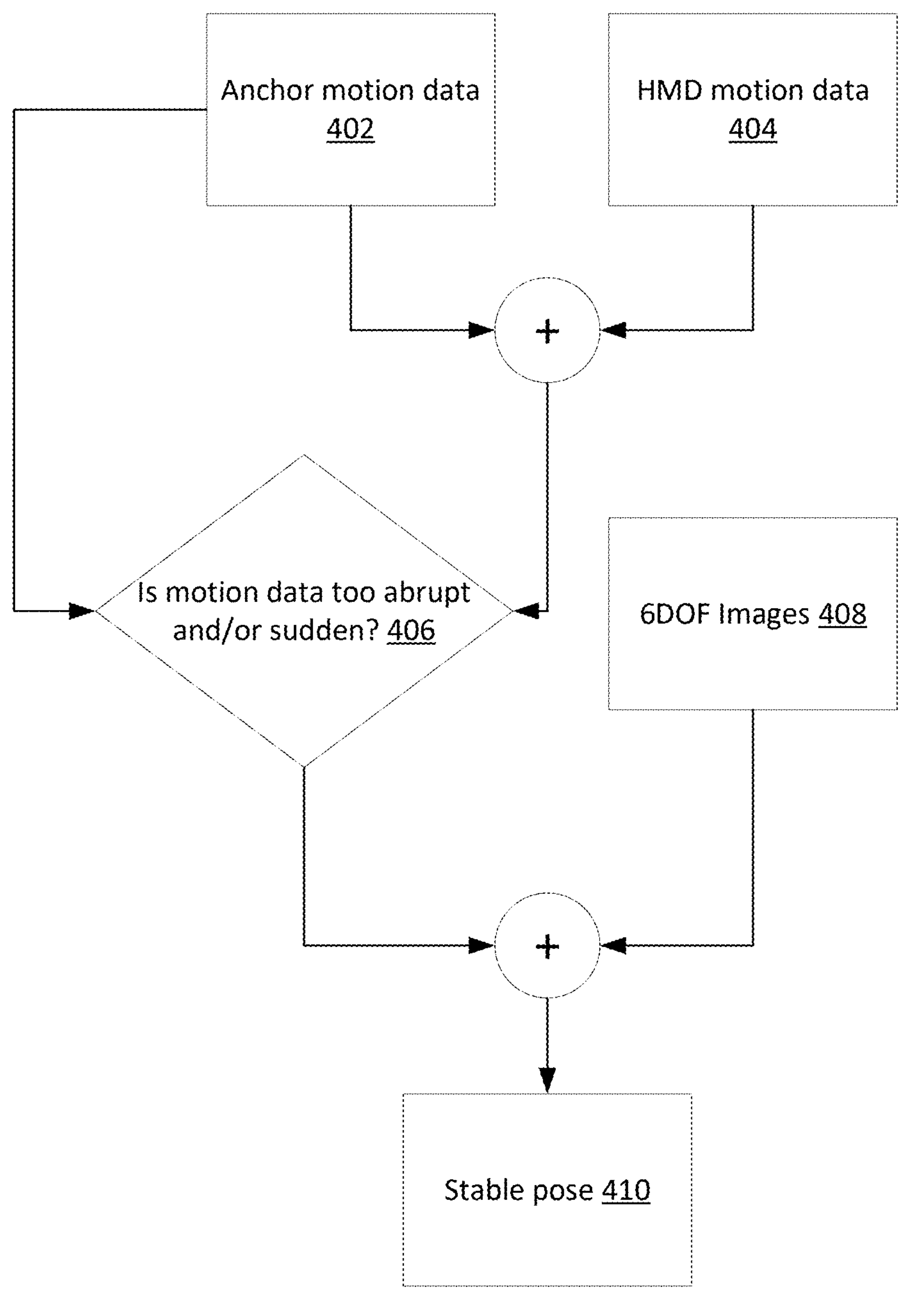
FIG. 4 illustrates a flow diagram to determine a pose of a head mounted display (HMD), according to an embodiment.

FIG. 4 illustrates a flow diagram to determine a pose of a head mounted display (HMD), according to an embodiment. At 402, motion data (e.g., IMU data, 6DOF vector) for an anchor is received (e.g., at head mounted display 110), such as sensor data captured by sensor(s) 121 of anchor 120. For example, an accelerometer, IMU, and/or gyroscope included in an anchor can capture motion data of the anchor. At 404, motion data (e.g., IMU data, 6DOF vector) for an HMD is received (e.g., at head mounted display 110), such as sensor data captured by sensor(s) 111 of HMD 110. For example, an accelerometer, IMU, and/or gyroscope included in an HMD can capture motion data of the HMD. At 406, a determination is made (e.g., at head mounted display 110) if the motion data for the anchor at 402 and/or motion data for the HMD at 404 is too abrupt and/or sudden (e.g., acceleration exceeds a predetermined threshold within a predetermined period of time). If the determination at 406 is no (the motion data for the anchor at 402 and/or motion data for the HMD at 404 is not too abrupt and/or sudden), a pose of the HMD is determined at 410 based on 6DOF images from 408 (e.g., images captured by a camera(s) of an HMD of light patterns generated by an anchor), the motion data for the anchor at 402, and the motion data for the HMD at 404. If the determination at 406 is yes (the motion data for the anchor at 402 and/or motion data for the HMD at 404 is too abrupt and/or sudden), a pose of the HMD is determined (e.g., by head mounted display 110) at 410 based on 6DOF images from 408 and not (1) the motion data for the anchor at 402 and (2) the motion data for the HMD at 404.

Figure 5:
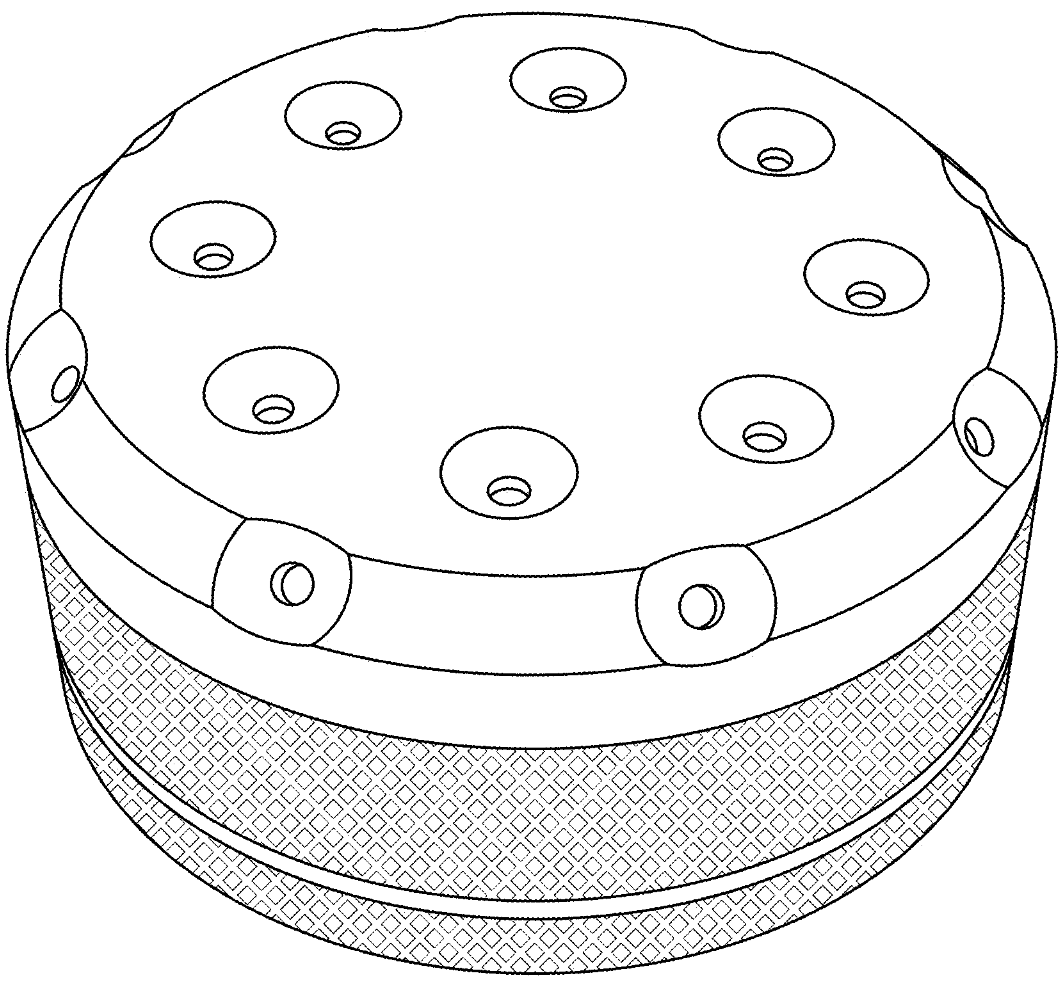
FIGS. 5 and 6 illustrate perspective views of an anchor, according to some embodiments.
Figure 6:
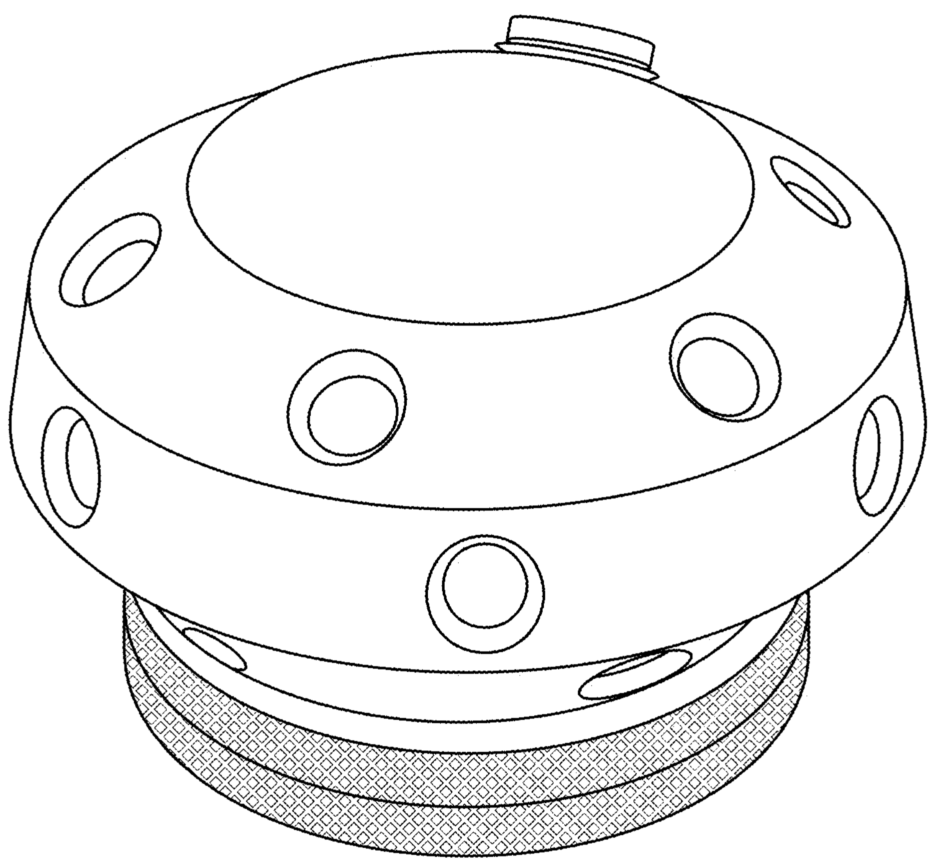
Figure 7:
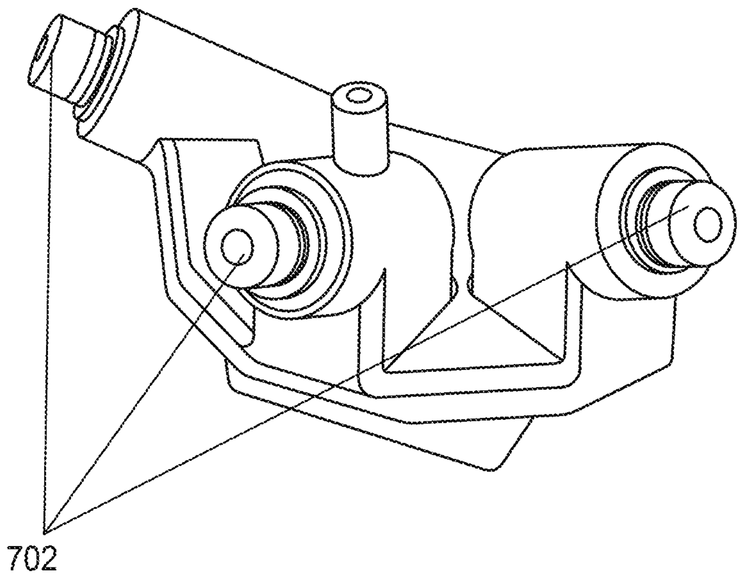
FIG. 7 illustrates an example of a laser projector configured to generate lasers, according to an embodiment.

FIGS. 5 and 6 illustrate perspective views of an anchor, according to some embodiments. For example, the anchors illustrated in FIGS. 5 and 6 are examples of anchor 120 from FIG. 1 and anchor 220 from FIG. 2. As illustrated, the anchors can include multiple light projectors (e.g., similar to light projectors 124 of FIG. 1) where light can be emitted in multiple directions. In some implementations, the light projectors can be lasers. For example, FIG. 7 illustrates an example of a laser projector that includes laser 702 configured to generate lasers, according to an embodiment. Although not illustrated, the anchors illustrated in FIGS. 5 and 6 can further include sensors (e.g., similar to sensor(s) 121) configured to sense motion of the anchors. Further, although not illustrated, the anchors illustrated in FIGS. 5 and 6 can further includes attachment mechanisms (e.g., to attach the anchors to a surface, such as ceiling or floor of a vehicle).

In some implementations, the anchors illustrated in FIGS. 5 and 6 include laser projectors (e.g., diode, VCSELs, DOE), microcontroller (e.g., with Bluetooth), an inertial measurement unit, a battery, and an attachment mechanism. In some implementations, a laser projector includes a laser configured to generate a laser and anything else that can be used to project the laser at a pattern (e.g., an optical element). In some implementations, the anchors illustrated in FIGS. 5 and 6 can emit light onto surfaces at least six meters from the anchors at a 360 degree azimuth range and within-60 to 90 degrees of elevation.

Figure 8:
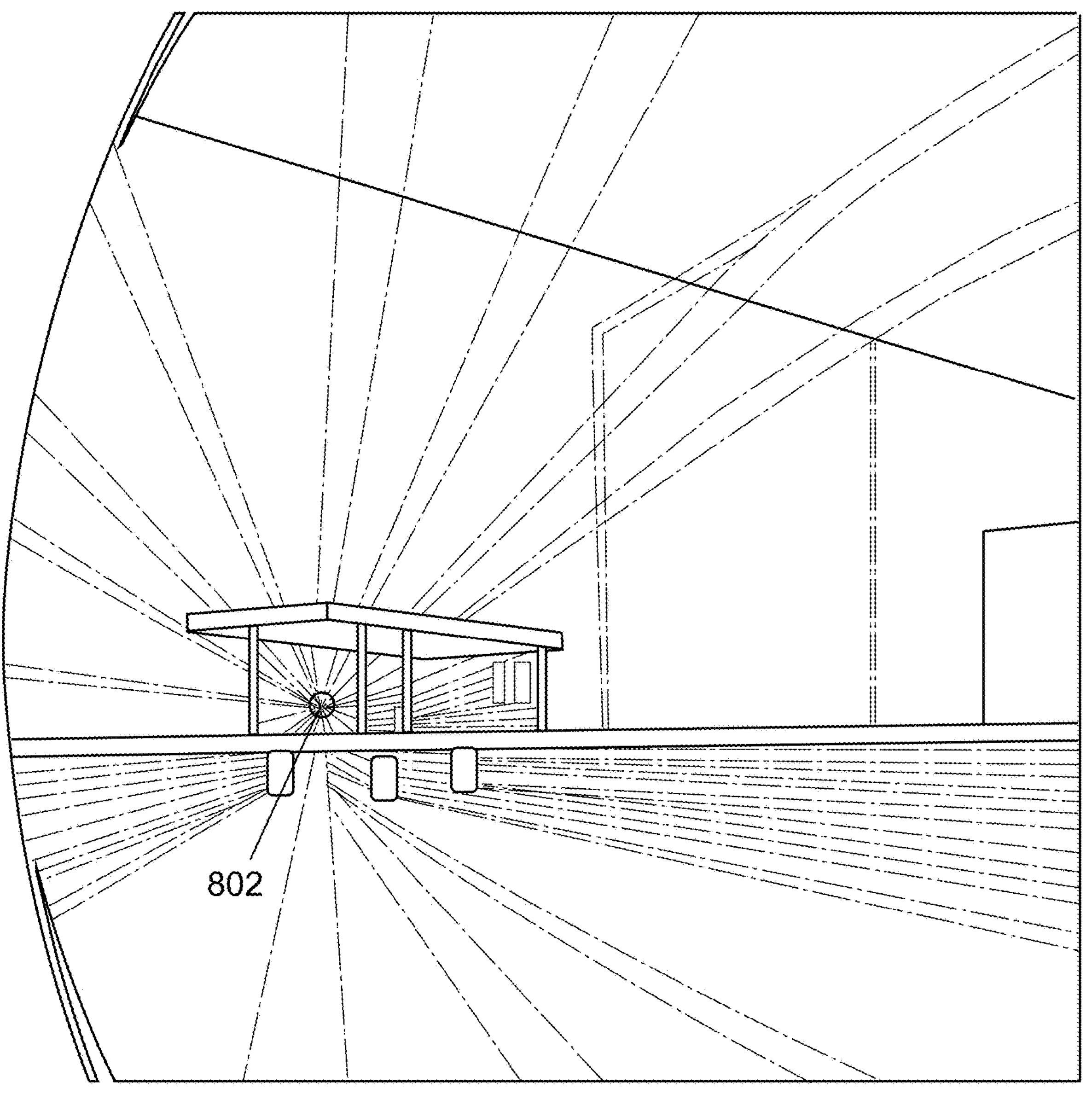
FIG. 8 illustrates an example of light patterns generated by an anchor, according to an embodiment.

FIG. 8 illustrates an example of light patterns generated by an anchor, according to an embodiment. Anchor 802 (e.g., similar to anchor 120) can be coupled to a surface via an attachment mechanism, such as to a wall. Anchor 802 can also include light projectors, such as the laser projectors illustrated in FIG. 7, configured to emit the light patterns onto multiple surfaces. The various lights patterns can have matching colors, varying colors, matching patterns, varying patterns, identical intensities, varying intensities, and/or the like.

Figure 19A:
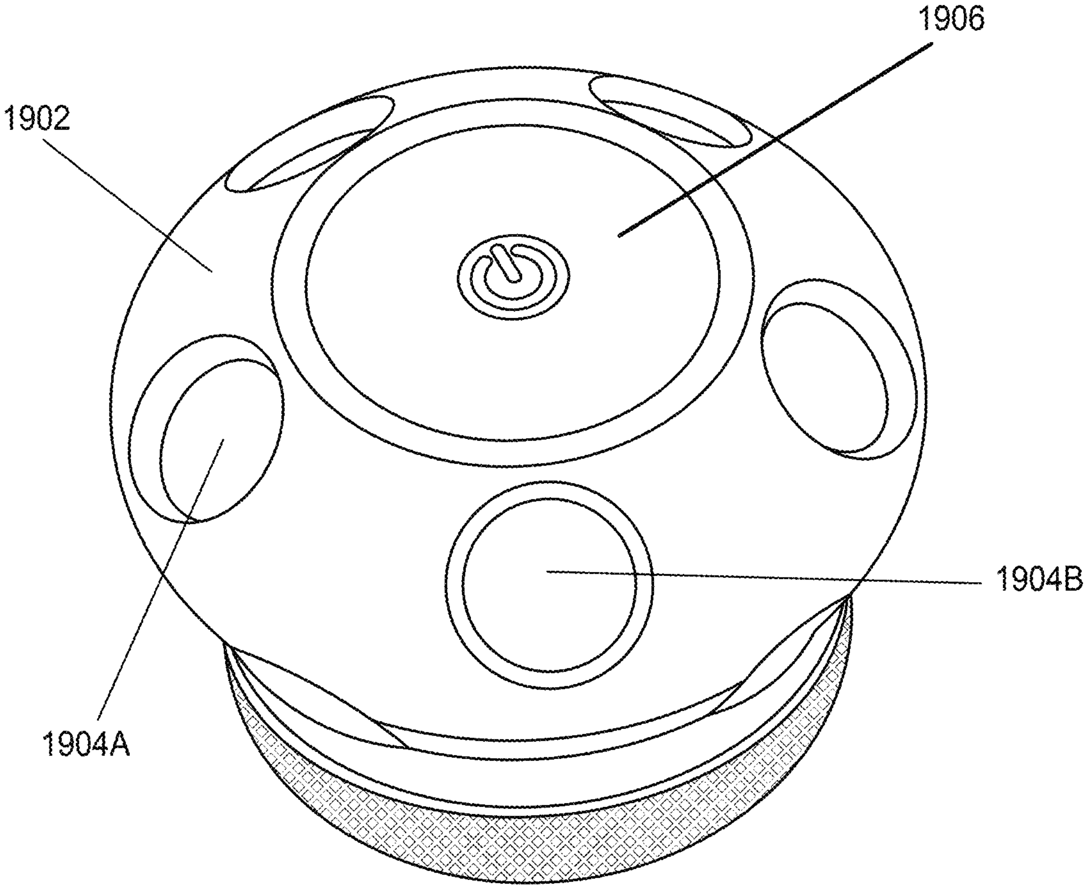
FIGS. 19A and 19B illustrate a perspective top view and a perspective bottom view, respectively, of an anchor, according to an embodiment.
Figure 19B:
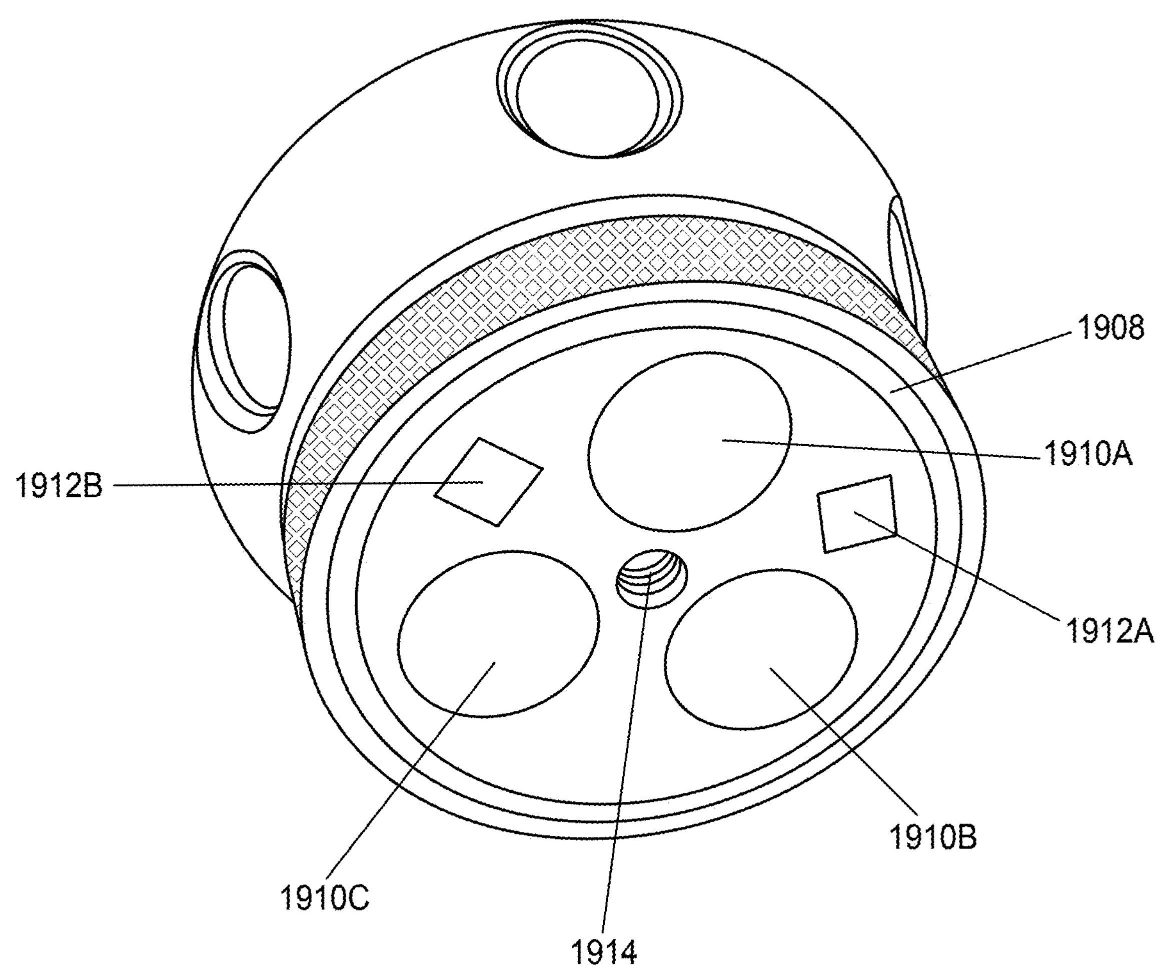

FIGS. 19A and 19B illustrate a perspective top view and a perspective bottom view, respectively of an anchor, according to an embodiment. The anchor illustrated at FIGS. 19A and 19B can be similar in structure and/or function to, for example, anchor 120 of FIG. 1.

FIG. 19A illustrates a perspective top view of the anchor, according to an embodiment. The anchor includes body 1902. Body 1902 can be made of, for example, plastics, titanium, anodized aluminum, stainless steel, carbon fiber, and/or the like. Although not shown in FIG. 19A or 19B, light projectors (e.g., light projectors 124) and/or one or more sensors (e.g., sensor(s) 121) can be located at/within body 1902. For example, the anchor can includes windows, such as windows 1904A and 1904B, where the light projectors can project light through the windows and/or one or more sensors can capture sensor data through the windows. The windows can be a fully- or semi-transparent material, such as glass or plastic. The windows can also serve to protect the light projectors and/or sensor(s) from, for example, debris moving within a moving vehicle. The anchor can also include power button 1906. Power button 1906 can be pressed to turn the anchor on and/or off. Turning on (powering up) the anchor can include, for example, turning on (powering up) the light projectors such that the light projectors project light and/or turning on (powering up) at least one sensor such that the sensor(s) captures sensor data. Turning off (powering down) the anchor can include, for example, turning off (powering down) the light projectors such that the light projectors do not project light and/or turning off (powering down) at least one sensor such that the sensor(s) does not capture sensor data.

FIG. 19B illustrates a perspective bottom view of the anchor, according to an embodiment. The anchor includes ring pad 1908. Ring pad 1908 can provide a cushion for the anchor such that physical damage to the anchor (and/or components thereof) is prevented and/or reduced. Ring pad 1908 can be useful, for example, to protect light projectors and/or sensors of the anchor from potential damage caused by vehicle vibrations or movement. The anchor can further include magnets 1910A, 1910B, and 1910C. Magnets 1910A, 1910B, and 1910C can be configured to couple the anchor to the vehicle, a mount affixed to the vehicle, and/or the like. The anchor can also include labels 1912A and 1912B. Labels 1912A and/or 1912B can be, for example, glow in the dark such that a user can determine where the bottom side of the anchor is (e.g., while in a dark vehicle). The anchor can also include receptable 1914. Receptable 1914 can be used to, for example, mount the anchor to the vehicle and/or another mount affixed to the vehicle (e.g., as illustrated in FIG. 21).

Figure 20:
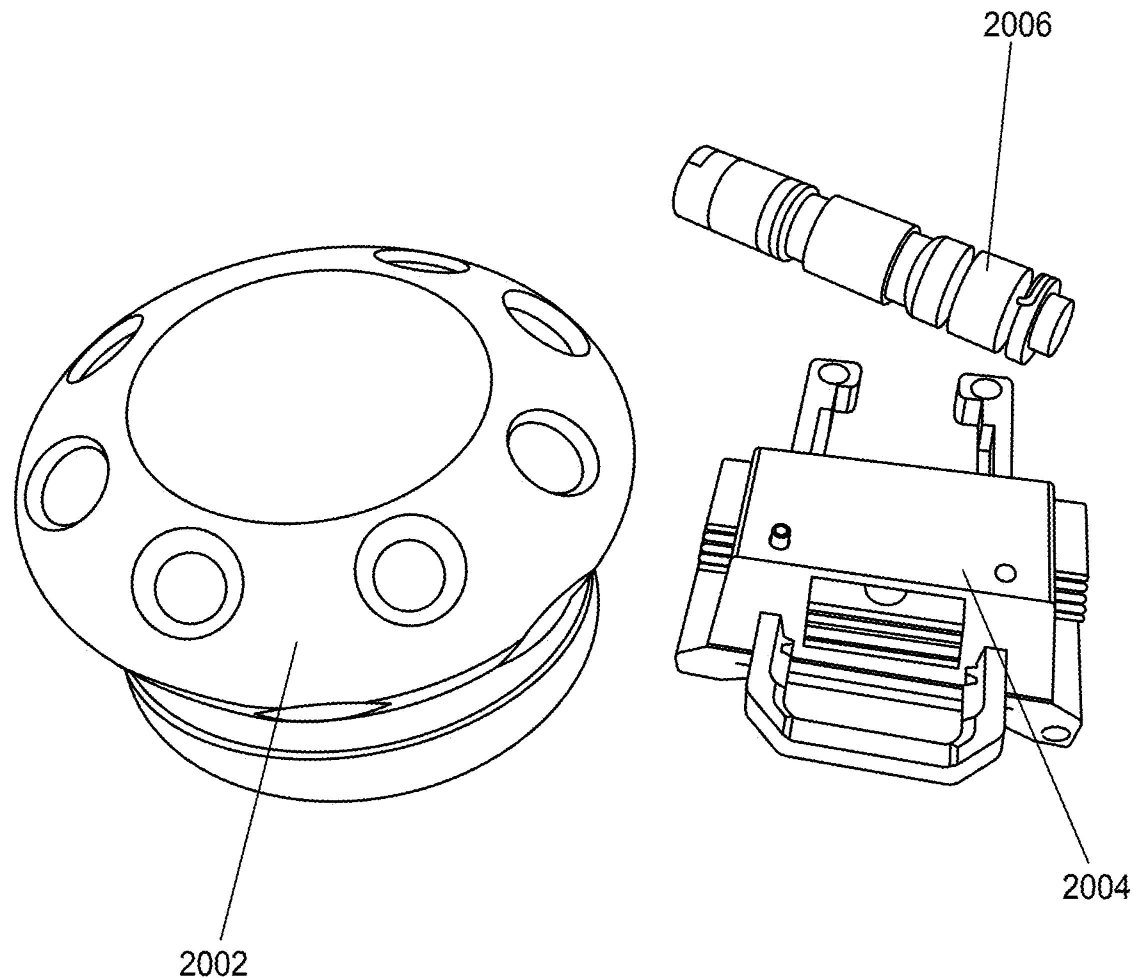
FIG. 20 illustrates an anchor, a helmet mount, and a night vision lens, according to an embodiment.

FIG. 20 illustrates an anchor, a helmet mount, and a night vision lens, according to an embodiment. Anchor 2002 can be similar in structure and/or functionality to the anchor illustrated in FIGS. 19A and 19B. Helmet mount 2004 can be configured to, for example, mount onto an HMD (e.g., HMD 110). Night vision lens 2006 can also be mounted onto the HMD via helmet mount 2004. For example, night vision lens 2006 can be coupled to a first end of helmet mount 2004, and the HMD can be coupled to a second end of helmet mount 2004.

Figure 21:
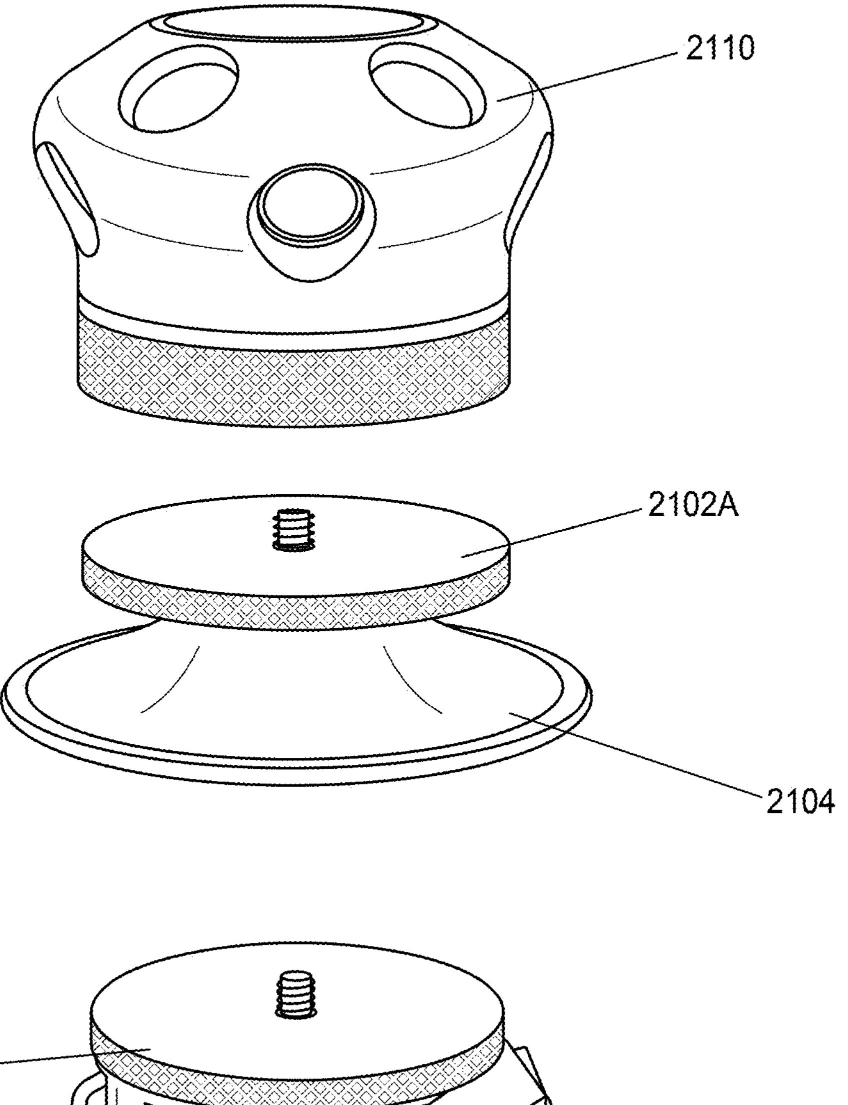
FIG. 21 illustrates an exploded view of an anchor and an anchor mount configured to mount the anchor to a surface or a pipe, according to an embodiment.

FIG. 21 illustrates an exploded view of an anchor and an anchor mount configured to mount the anchor to a surface or a pipe, according to an embodiment. FIG. 21 includes anchor 2110, which can be similar in structure and/or functionality to anchor 2002 and/or the anchor illustrated in FIGS. 19A and 19B. Anchor 2110 and anchor mount 2102A can be coupled to each other (e.g., using any coupling technique, such as a standoff and screw). Alternatively, anchor 2110 and anchor mount 2102B can be coupled to each other (e.g., using any coupling technique, such as a standoff and screw). Suction cup 2104 can be configured to attach onto a surface, such as a wall, window, or ceiling (e.g., of a vehicle). Pipe strap 2108 can be configured to affix onto a pipe (e.g. a pipe within a vehicle). Therefore, upon coupling anchor 2110 to anchor mount 2102 (e.g., via anchor mount 2102A or anchor mount 2102B), anchor 2110 can be mounted to a surface using suction cup 2104 or mounted to a pipe using pipe strap 2108.

Figure 9:
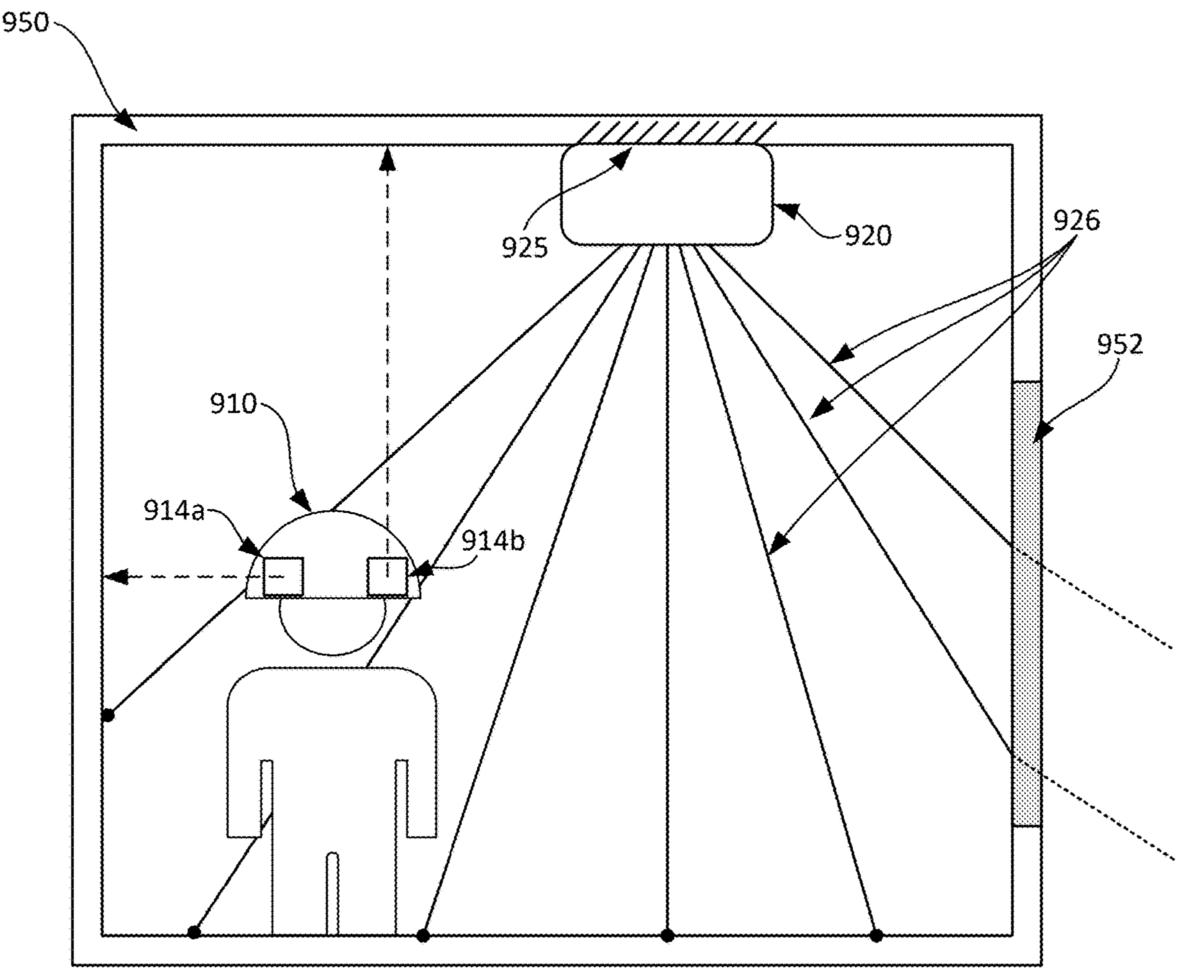
FIG. 9 schematically depicts generation of a pattern in an enclosed space for tracking head movement, according to some embodiments.

FIG. 9 schematically depicts an example scene, including a moving transport 950 and a user wearing an HMD 910 within the moving transport 950, according to one or more embodiments. As shown, the moving transport 950 can have multiple walls or surfaces. The HMD 910 can be structurally and/or functionally similar to the HMD 110 described with reference to FIG. 1. An anchor device 920 can be attached to a ceiling of the moving transport. The anchor device 920 can be structurally and/or functionally similar to the anchor device 120 described with reference to FIG. 1. The anchor device 920 can include an attachment mechanism 925, such as, for example, a mechanical latch, clamp, fastener, or other component, a magnet, and/or an adhesive. As described above, the anchor device 920 can include one or more light projectors (e.g., light projectors 124), which can be configured to project light 926 in multiple directions within the moving transport 950. The projected light 926 can be configured to form patterns on the walls of the moving transports, which can be captured by cameras on the HMD 910. The HMD 910, via its onboard processor (e.g., processor 112) and/or in communication with a processor (e.g., processor 132 of nearby or remote compute device), can then determine the head poses of the users based on the images captured by the cameras.

For illustrative purposes, one of the walls is shown with a window 952. In some embodiments, the HMD 910 can be equipped with optical elements 914*a*, 914*b*, which can be configured to alter a line of sight or field of view of the cameras of the HMD 910. The optical elements 914*a*, 914*b* can be structurally and/or functionally similar to the optical element(s) 114 described with reference to FIG. 1. In use, the optical elements 914*a*, 914*b* can be attached, e.g., by a user, to the HMD 910. The user can adjust the position or orientation of each optical element 914*a*, 914*b*, to redirect the light of a camera of the HMD 910, as schematically depicted via dashed arrows in FIG. 9. For example, the user can adjust the optical element 914*a* to redirect light toward a first opaque wall (e.g., left wall) of the vehicle and the optical element 914*b* to redirect light toward a second opaque wall (e.g., a ceiling) of the vehicle. In particular, the user can use the optical elements 914*a*, 914*b* to redirect light away from the wall including the window 952, where a portion of a light pattern may be lost due to the window 952.

In some embodiments, the anchor 920 also includes sensors (e.g., an IMU; not shown in FIG. 9) that can capture information regarding the movement of itself, and therefore the transport 950 (which the anchor 920 is rigidly attached to). The anchor 920 can send this information (e.g., wirelessly and/or wired) to the HMDs 910 of the users located within the transport 950. HMD 910 can then determine the head pose of the user, based on the IMU data from the anchor 920 in combination with IMU data or other motion data captured at the HMD 910. Although only one HMD and user is shown in FIG. 9, multiple HMSs and/or users can be present; in such situations, anchor 920 can send the information (e.g., motion data) to all HMDs.

Figure 10A:
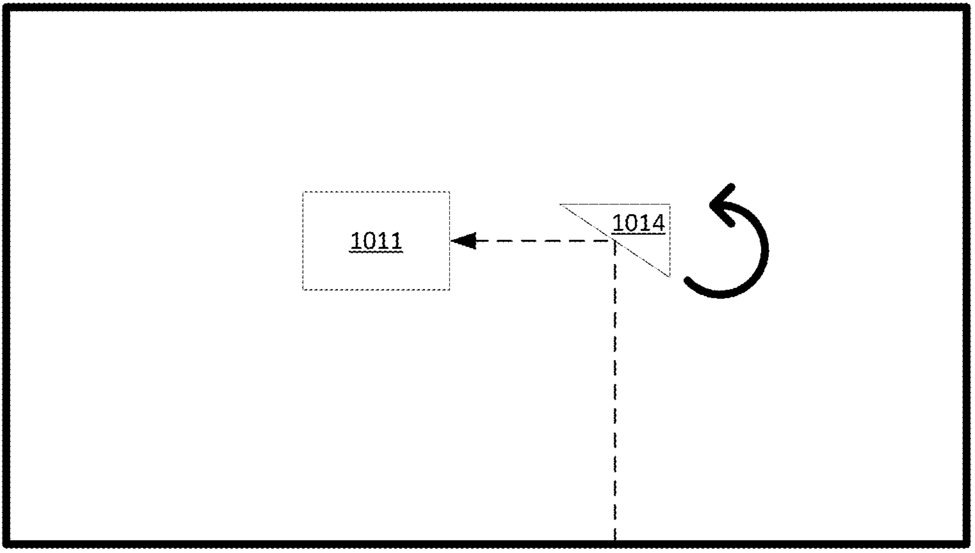
FIGS. 10A and 10B schematically depict an adjustable optical element, according to embodiments.
Figure 10B:
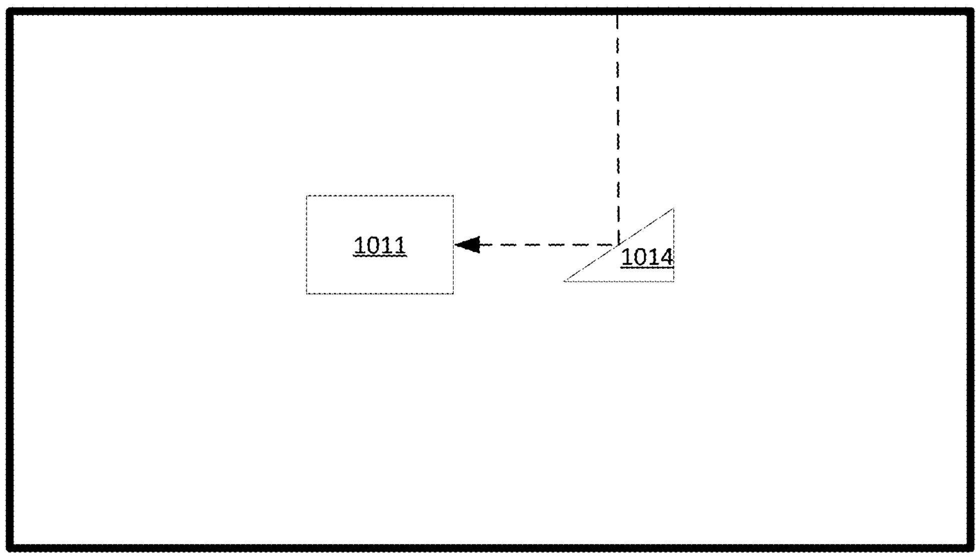

FIGS. 10A and 10B schematically depict how an optical element 1014 can be configured to redirect light to a camera 1011 from different surfaces, according to embodiments. As shown in FIG. 10A, a camera 1011 (e.g., functionally and/or structurally similar to cameras as described with reference to FIGS. 1 and 9) can receive light in a first direction via an optical element 1014 (e.g., functionally and/or structurally similar to optical element(s) 114, 914*a*, 914*b* described with reference to FIGS. 1 and 9), which can redirect the light reflected from a surface in one of multiple directions. FIG. 10A shows the optical element 1014 reflecting light from a bottom surface (e.g., lap of user) or floor, while FIG. 10B shows the optical element 1014 reflecting light from a top surface or ceiling. The optical element 1014 can be adjusted to redirect light in different directions via rotation of the optical element, as schematically depicted in FIG. 10A with the arrow.

Figure 11:
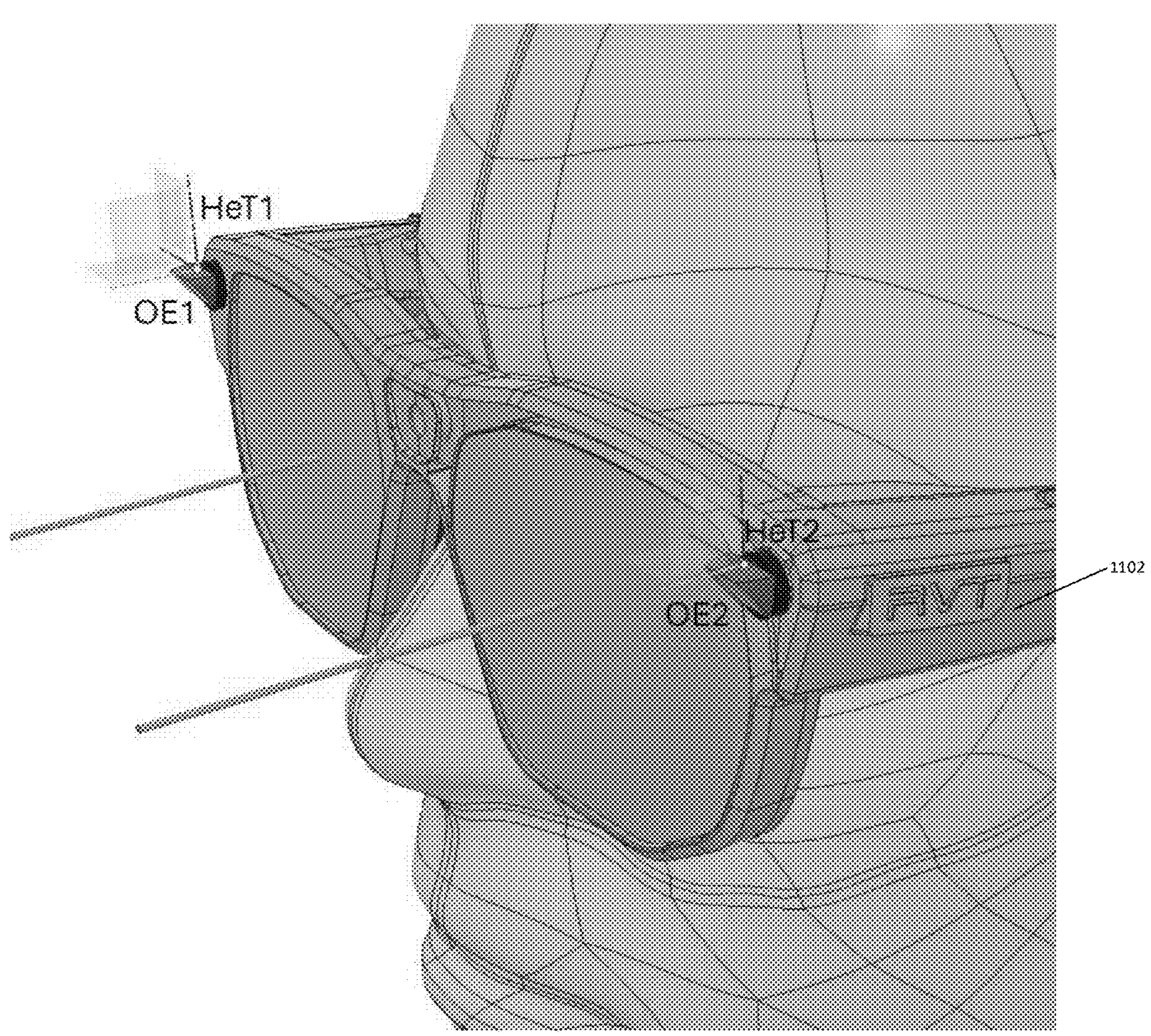
FIG. 11 illustrates an HMD that includes multiple optical elements, according to an embodiment.

FIG. 11 illustrates an HMD that includes multiple optical elements, according to an embodiment. HMD 1102 includes two optical elements—OE1 and OE2—and two cameras—HeT1 and HeT2. Optical element OE1 is located/positioned/oriented) in a field of view of camera HeT1 and not in a field of view of camera HeT2. Optical element OE2 is located/positioned/oriented in a field of view of camera HeT2 and not in a field of view of camera HeT1. Optical elements OE1 and/or OE2 can be configurable into different orientations such that the different orientations direct light from different scenes towards cameras HeT1 and/or HeT2. For example, optical element OE1 can be oriented in a first direction such that camera HeT1 captures light from a first scene (e.g., that is not opaque) then optical element OE1 can be oriented in a second direction at a second time such that camera HeT1 captures light form a second scene (e.g., that is opaque). A surface that includes a window and/or has a view of the outside from inside the vehicle is an example of a non-opaque surface.

In some implementations, optical elements OE1 and/or OE2 can be oriented and/or re-oriented manually by a user (e.g., that is wearing the HMD). For example, an user can grab optical elements OE1 and/or OE2 and twist to modify an orientation of optical elements OE1 and/or OE2. In some implementations, a representation of an orientation of OE1 and/or OE2 is displayed at HMD 1102 such that the user of knows the current orientation of OE1 and/or OE2 without having to take off HMD 1102; further, as an orientation of OE1 and/or OE2 is modified, a representation of the orientation as the orientation changes can be displayed in substantially real time to the user.

In some implementations, optical elements OE1 and/or OE2 can be oriented and/or re-oriented automatically (e.g., without human intervention). For example, if a processor (e.g., processor 112 of HMD 110) detects from images and/or video captured by cameras HeT1 and/or HeT2 that the images and/or video include non-opaque surfaces, the processor can send an electronic signal (e.g., to a motor (not shown) configured to orient and/or re-orient optical elements OE1 and/or OE2) to cause an orientation of optical elements OE1 and/or OE2 to be modified until images and/or video are captured that don't include non-opaque surfaces (e.g., no images and/or videos of a window with an outside view). If a space doesn't include an opaque surface, a remedial action can occur (e.g., an alert is generated, the HMD displays instructions instructing the user of the HMD to go to a different space that includes an opaque surface, a pose of the HMD/user of the HMD is determined using images but not motion data, etc.). In some implementations, a machine learning model can be trained to detect whether images and/or video include a representation(s) of an opaque or non-opaque surface. For example, the machine learning model can be a neural network trained using images and/or video including opaque and/or non-opaque surfaces and using labels indicating whether the associated images and/or videos include opaque and/or non-opaque surfaces as target learning data. In some implementations, an opaque surface refers to a surface that blocks substantially all light (e.g., 100%, at least 99%, at least 98%, at least 95%, at least 90%, at least 80%, at least 75%, and/or the like).

Figure 12A:
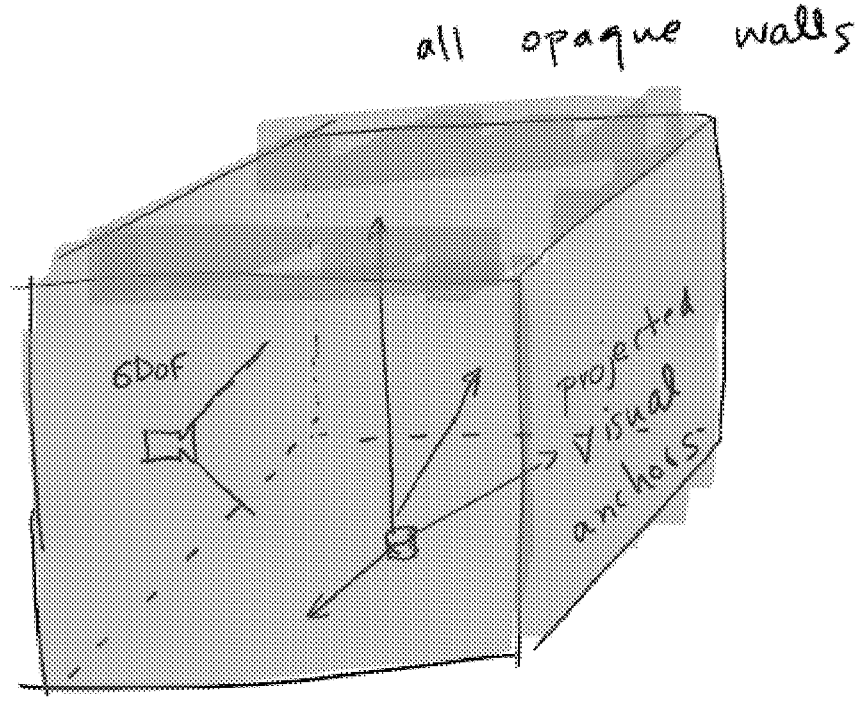
FIG. 12A illustrates an example of a space where the walls are all opaque walls.
Figure 12B:
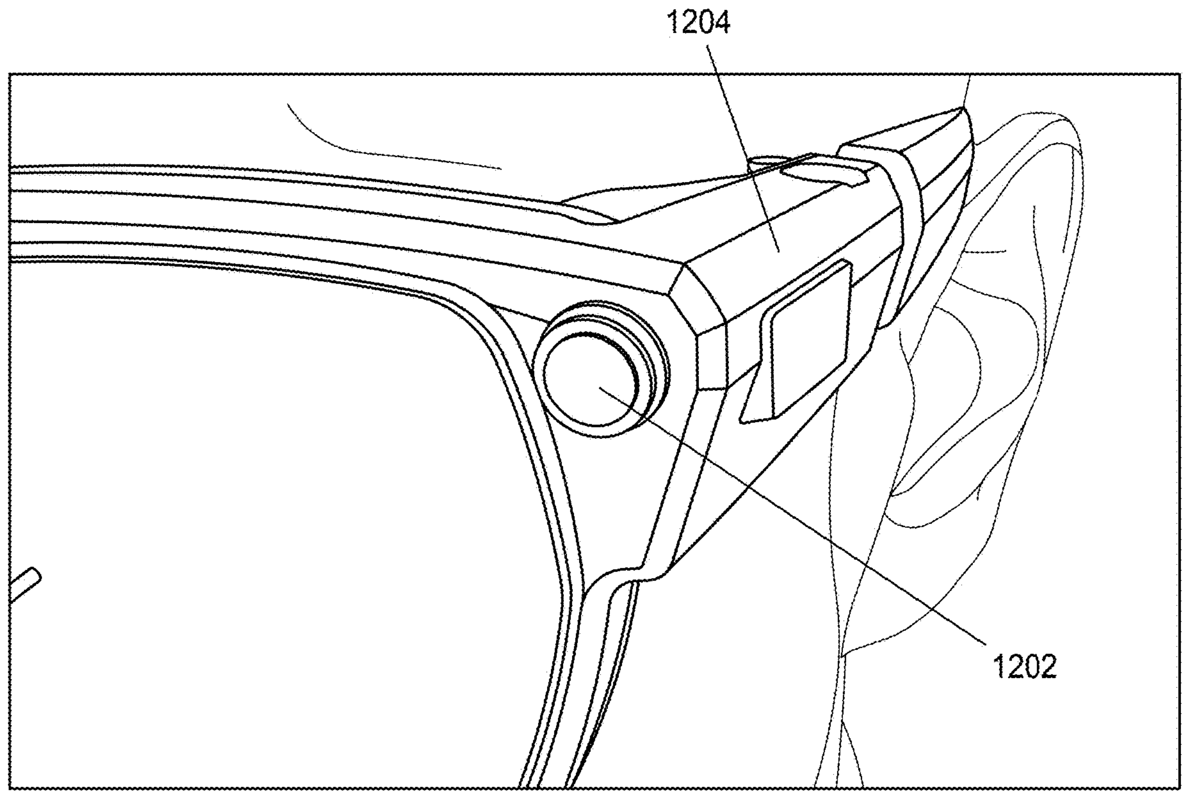
FIG. 12B illustrates an example of an HMD that can be used in the space illustrated in FIG. 12A, according to an embodiment.

FIG. 12A illustrates an example of a space (e.g., room, vehicle interior) where the walls (including the ceiling and surface) are all opaque walls. The space can include an anchor that projects light patterns onto the opaque walls. In such a space made up entirely of opaque walls, an HMD may not include optical elements (or, alternatively, the optical elements can be configured to receive light from any of the opaque surfaces having a light pattern(s)). Said differently, an optical element likely isn't needed to direct a field of view of a camera towards an opaque surface because the surfaces (walls) are already opaque. FIG. 12B illustrates an example of an HMD that can be used in the space illustrated in FIG. 12A, according to an embodiment. Because the space in FIG. 12A is made up entirely of opaque walls, an optical element is not located in front of camera 1202 of HMD 1204. Therefore, a pose of HMD 1204/the user wearing HMD 1204 can be determined without using an optical element to modify a field of view of camera 1202. In some implementations, where an optical element is not desired or needed, the optical element can be detachable (e.g., by a user). Additionally or alternatively, in some implementations, where an optical element is not desired or needed, the optical element can remain attached to HMD 1204 but in a configuration either (1) that doesn't block a field of view of camera 1202 or (2) that modifies a field of view of camera 1202 onto any surface (because all the surfaces are opaque).

Figure 13A:
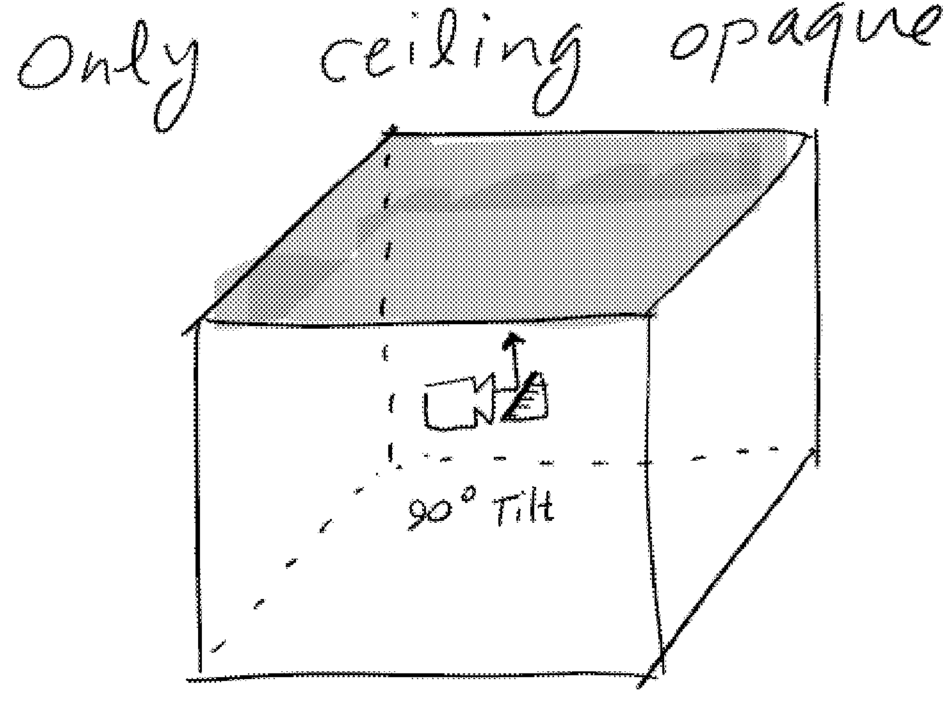
FIG. 13A illustrates an example of a space where the ceiling of the space is opaque but the remaining walls are not opaque.
Figure 13B:
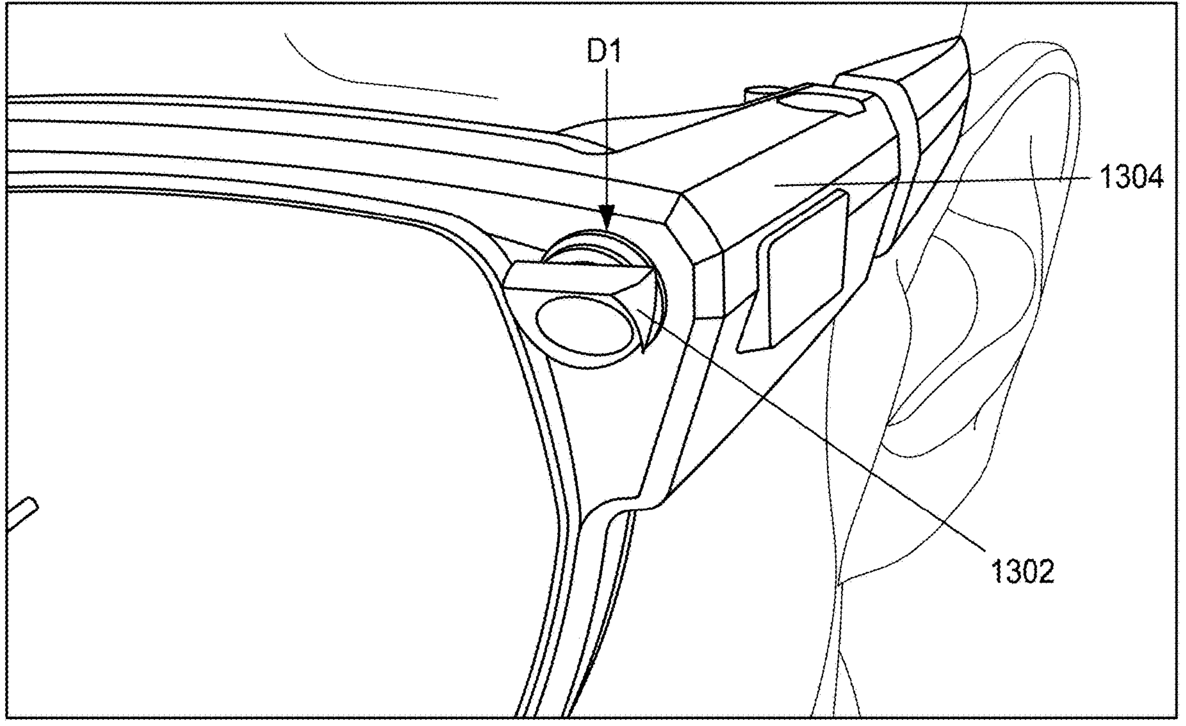
FIG. 13B illustrates an example of an optical element configuration that can be used in the space illustrated in FIG. 13B, according to an embodiment.

FIG. 13A illustrates an example of a space (e.g., room, vehicle interior) where the ceiling of the space is opaque but the remaining walls (side walls and floor) are not opaque. In such a scenario, capturing light/images of light patterns on the ceiling (and not the remaining walls) can be desirable to determine a pose of an HMD/user wearing the HMD. FIG. 13B illustrates an example of an optical element configuration that can be used in the space illustrated in FIG. 13B, according to an embodiment. Optical element 1302 can be configured to refract light from the ceiling to the camera of HMD 1404 while blocking (or preventing) light from the remaining walls (the side walls and the floor). Said differently, light in direction D1 can reach a camera of HMD 1304 by refracting through optical element 1302 and to the camera, while light from other directions (e.g., the side wall and the floor) are reflected off (or reflected away from) optical element 1302 and does not reach the camera of HMD 1304.

Figure 14A:
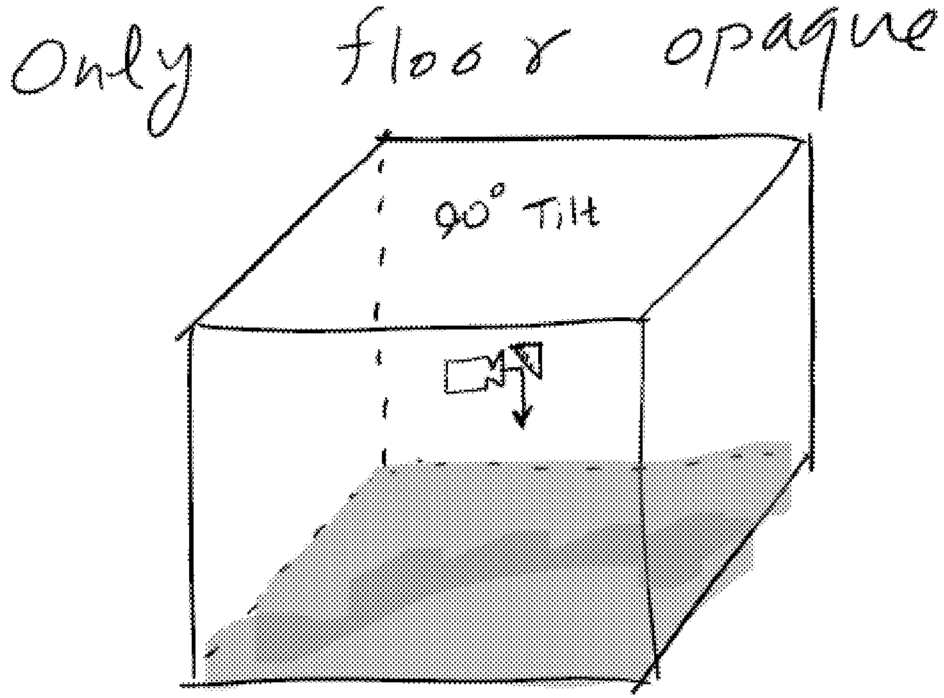
FIG. 14A illustrates an example of a space where the floor of the space is opaque but the remaining walls are not opaque.
Figure 14B:
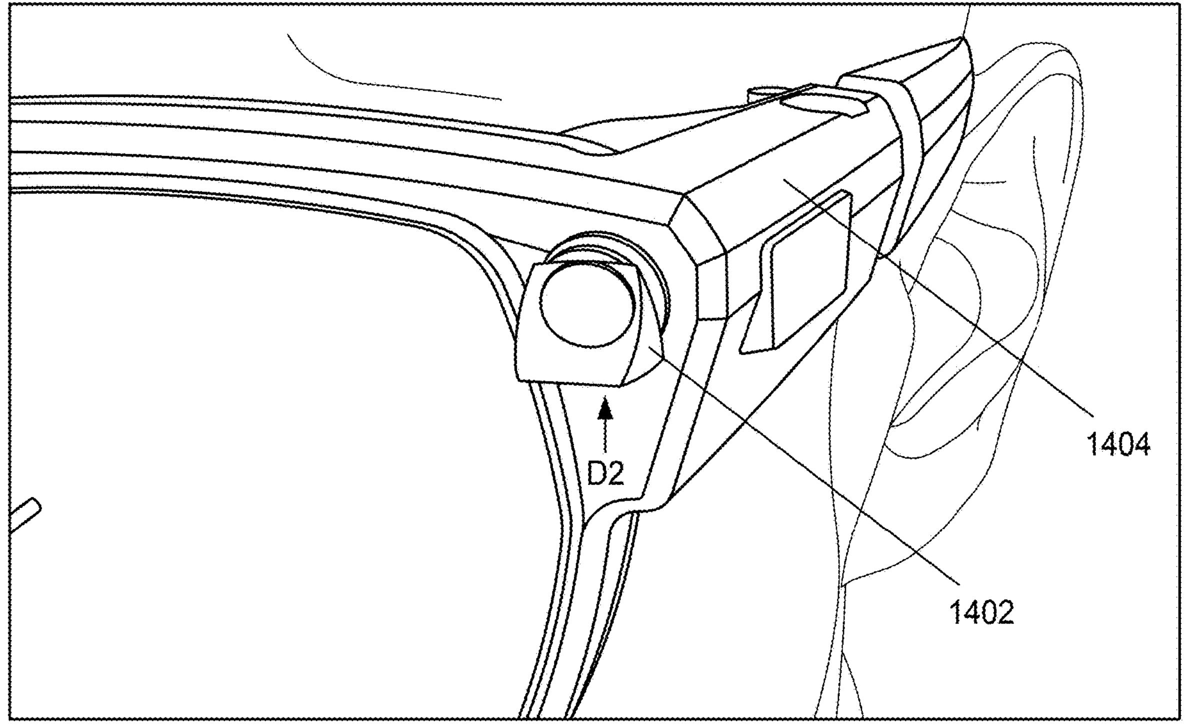
FIG. 14B illustrates an example of an optical element configuration that can be used in the space illustrated in FIG. 14A, according to an embodiment.

FIG. 14A illustrates an example of a space (e.g., room, vehicle interior) where the floor of the space is opaque but the remaining walls (side walls and ceiling) are not opaque. In such a scenario, capturing light/images of light patterns on the floor (and not the remaining walls) can be desirable to determine a pose of an HMD/user wearing the HMD. FIG. 14B illustrates an example of an optical element configuration that can be used in the space illustrated in FIG. 14A, according to an embodiment. Optical element 1402 can be configured to direct/refract light from the floor to the camera of HMD 1404 while blocking (or preventing) light from the remaining walls (the side walls and the ceiling). Said differently, light in direction D2 can reach a camera of HMD 1304 by refracting through (or refracted away from) optical element 1402 and to the camera, while light from other directions (e.g., the side wall and the floor) are reflected off (or refracted away from) optical element 1402 and does not reach the camera of HMD 1404.

Figure 15A:
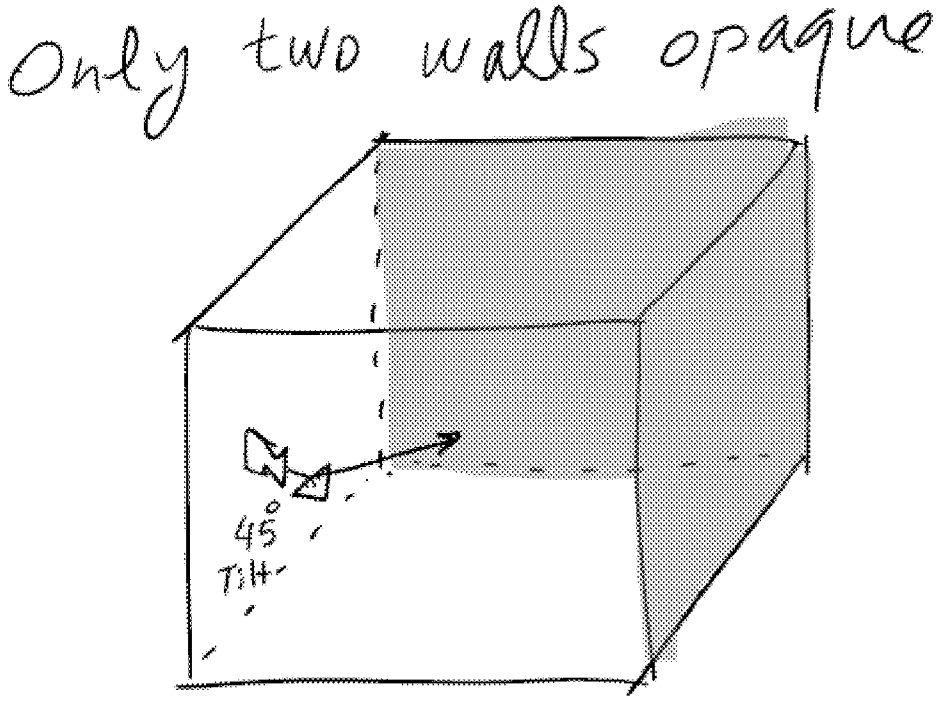
FIG. 15A illustrates an example of a space where a back wall and right wall of the space is opaque but the remaining walls are not opaque.
Figure 15B:
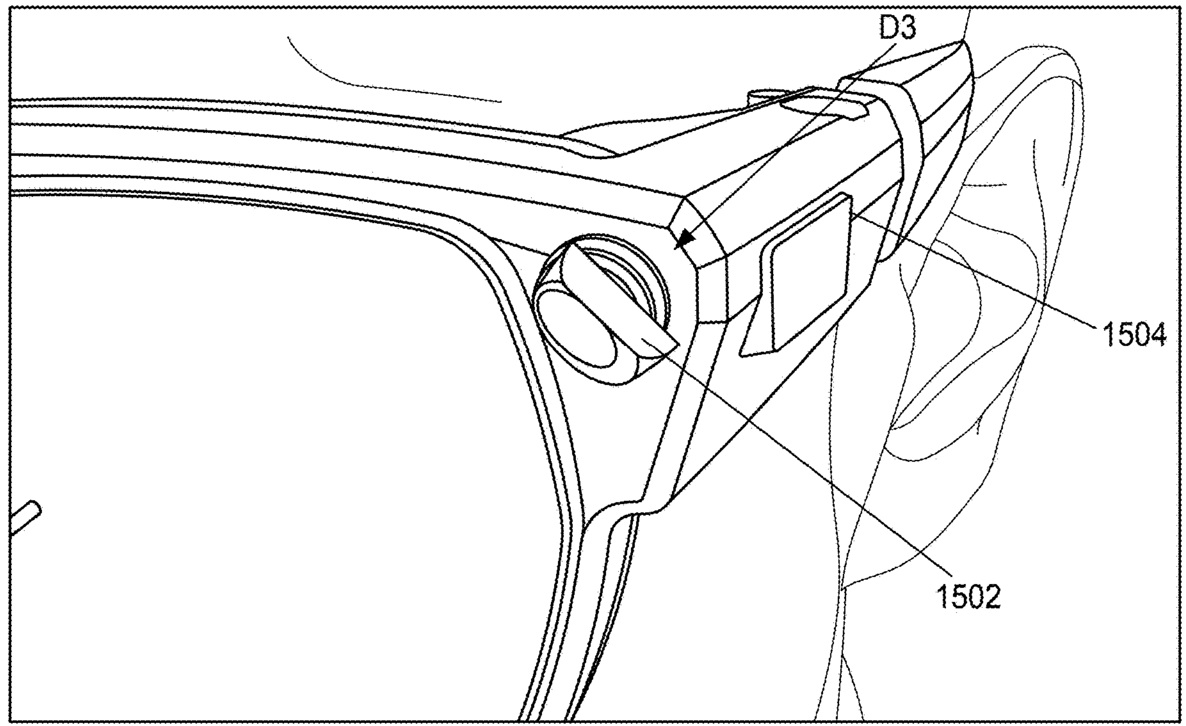
FIG. 15B illustrates an example of an optical element configuration that can be used in the space illustrated in FIG. 15A, according to an embodiment.

FIG. 15A illustrates an example of a space (e.g., room, vehicle interior) where a back wall and right wall of the space is opaque but the remaining walls (the left wall, the front wall, the ceiling, and the floor) are not opaque. In such a scenario, capturing light/images of light patterns on the back wall and right wall (and not the remaining walls) can be desirable to determine a pose of an HMD/user wearing the HMD. FIG. 15B illustrates an example of an optical element configuration that can be used in the space illustrated in FIG. 15A, according to an embodiment. Optical element 1502 can be configured to direct/refract light from the back and/or right walls to the camera of HMD 1504 while blocking (or preventing) light from the remaining walls (the left wall, the front wall, the ceiling, and the floor). Said differently, light in direction D3 can reach a camera of HMD 1504 by refracting through optical element 1502 and to the camera, while light from other directions (e.g., the left wall, the front wall, the ceiling, and the floor) are reflected off (or refracted away from) optical element 1502 and does not reach the camera of HMD 1504.

Although FIGS. 13B, 14B, and 15B illustrate a first optical element at an HMD, the HMD can further include a second optical element having substantially the same configuration (to capture light from an opaque surface(s)) as the first optical element. Additionally or alternatively, where multiple opaque surfaces are present, a first optical element can be configured to receive/reflect light from a first opaque surface and a second optical element can be configured to receive/reflect light from a second opaque surface different than the first opaque surface.

Figure 16:
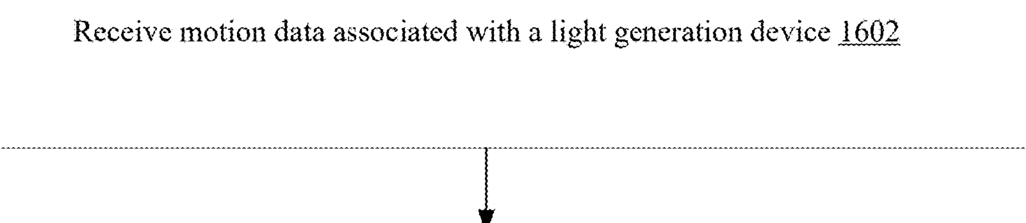
FIG. 16 illustrates a flowchart of a method to determine a head pose of a user wearing an HMD, according to an embodiment.

FIG. 16 illustrates a flowchart of a method 1600 to determine a head pose of a user wearing an HMD, according to an embodiment. In some implementations, method 1600 is stored as code in a memory (e.g., memory 113 of HMD 110) to be performed by a processor (e.g., processor 112 of HMD 110).

At 1602, motion data associated with a light generation device (e.g., anchor 120) is received. For example, with reference to FIG. 1, anchor 120 can send the motion data to HMD 110. At 1604, a determination is made whether at least one of motion data associated with an HMD (e.g., HMD 110) or the motion data associated with the light generation device has noise outside a predetermined acceptable range (e.g., signal to noise ratio is outside the predetermined acceptable range). Motion data associated with the HMD can be captured by, for example, a first sensor (e.g., included in sensor(s) 111) included in the HMD. At 1606, in response to determining that the at least one of the motion data associated with the HMD or the motion data associated with the light generation device has noise outside the predetermined acceptable range, a head pose of the user is determined (1) based on image data, (2) not based on the motion data associated with the HMD and (3) not based on the motion data associated with the light generation device. The image data can be captured by, for example, a second sensor (e.g., included in sensor(s) 111) included in the HMD. The image data can include, for example, a representation of light patterns generated by the light generation device. At 1608, in response to determining that the at least one of the motion data associated with the HMD or the motion data associated with the light generation device has noise within the predetermined acceptable range, a head pose of the user is determined based on image data and the at least one of the motion data associated with the HMD or the motion data associated with the light generation device.

In some implementations, 1604, 1606, and/or 1608 occur automatically (e.g., without human intervention) in response to completing 1602, 1604, and/or 1606, respectively. In some implementations of method 1600, the first sensor includes an inertial measurement unit and the second sensor includes a camera.

In some implementations of method 1600, determining the head pose of the user based on the image data, the motion data associated with the HMD, and the motion data associated with the light generation device at 1608 includes modifying the motion data associated with the HMD based on the motion data associated with the light generation device to generate modified motion data. The head pose of the user is determined based on the modified motion data.

In some implementations of method 1600, the motion data associated with the light generation device and the motion data associated with the HMD are unsynchronized.

In some implementations of method 1600, the light generation device is configured to generate the light patterns in an environment having a light level that is otherwise less than one-lux. Said differently, although the environment may be more or less than one-lux after the light patterns are generated, the environment would be less than one-lux if the light patterns were not generated.

In some implementations of method 1600, the HMD and the light generation device are located inside a vehicle (e.g., a military vehicle). In some implementations of method 1600, the HMD and the light generation device are located inside a vehicle, the light generation device includes an attachment, and the light generation device is coupled to a surface of the vehicle via the attachment.

In some implementations of method 1600, the light generation device includes a plurality of light projectors (e.g., light projectors 124) configured to generate the light patterns that are projected in multiple directions onto multiple surfaces. In some implementations of method 1600, the HMD and the light generation device are located inside a vehicle, and the light generation device is configured to generate the light patterns that are projected in multiple directions onto multiple surfaces of the vehicle.

Some implementations of method 1600 further include a mirror (e.g., optical element(s) 114) coupled to the HMD and in a field of view of the second sensor. The image data is captured by the second sensor via the mirror. Some implementations of method 1600 further include a mirror (e.g., optical element(s) 114) coupled to the HMD and in a field of view of the second sensor. The image data is captured by the second sensor via the mirror. The mirror is configured such that the second sensor receives light (1) from a first surface not including an outside view and (2) not from a second surface including the outside view.

Figure 17:
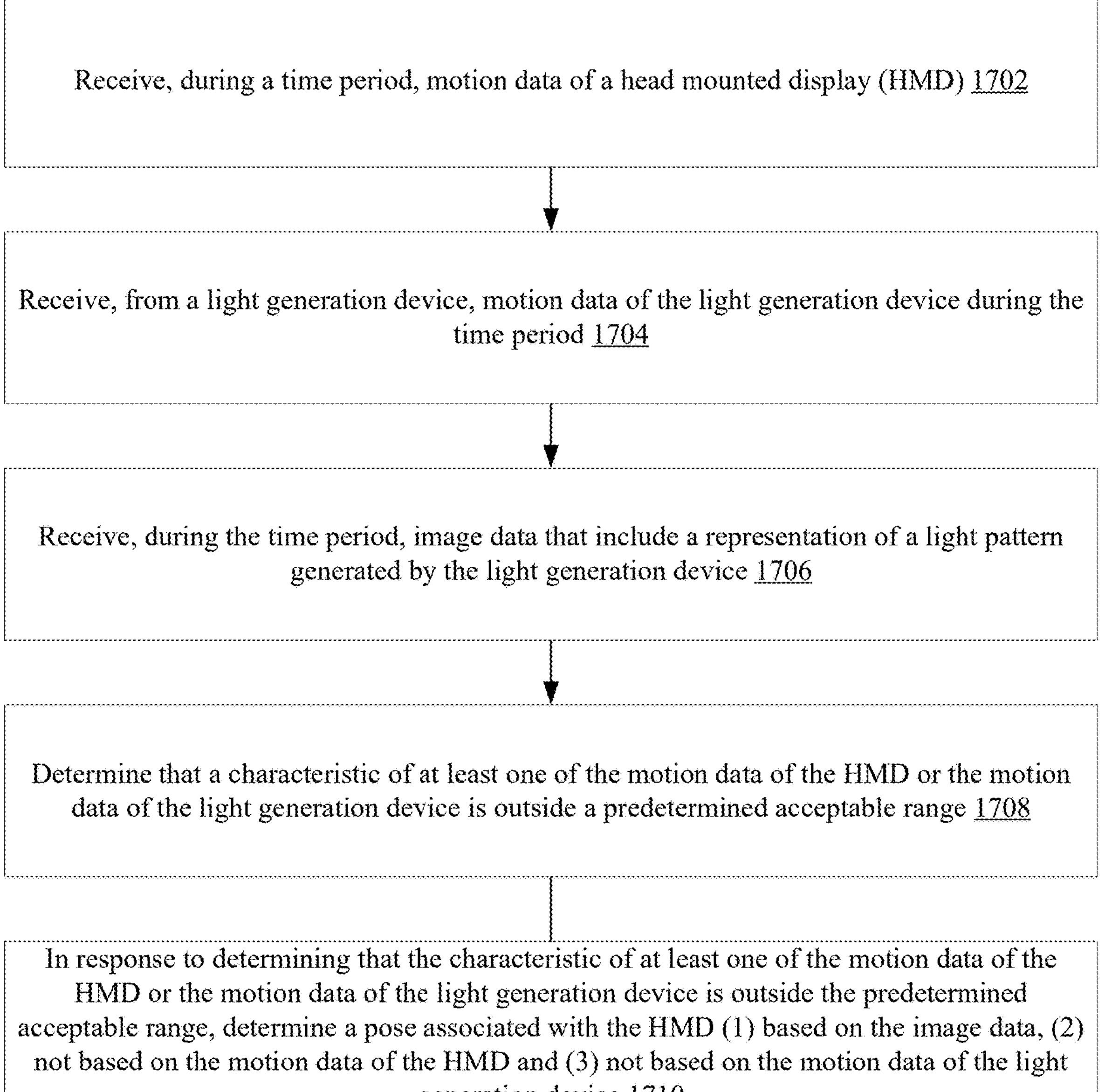
FIG. 17 illustrates a flowchart of a method to determine a head pose of a user wearing an HMD in response to motion data being outside a predetermined acceptable range, according to an embodiment.

FIG. 17 illustrates a flowchart of a method 1700 to determine a head pose of a user wearing an HMD in response to motion data being outside a predetermined acceptable range, according to an embodiment. In some implementations, method 1700 is stored as code in a memory (e.g., memory 113 of HMD 110) to be performed by a processor (e.g., processor 112 of HMD 110).

At 1702, motion data of a head mounted display (HMD) (e.g., HMD 110) is received (e.g., captured) during a time period. At 1704, motion data of a light generation device (e.g., anchor 120) during the time period is received from the light generation device. At 1706, image data that includes a representation of a light pattern generated by the light generation device during the time period is received (e.g., captured). At 1708, a determination is made that a characteristic of at least one of the motion data of the HMD or the motion data of the light generation device is outside a predetermined acceptable range. At 1710, in response to determining that the characteristic of at least one of the motion data of the HMD or the motion data of the light generation device is outside the predetermined acceptable range, a pose associated with the HMD is determined (1) based on the image data, (2) not based on the motion data of the HMD and (3) not based on the motion data of the light generation device.

In some implementations of method 1700, 1704, 1706, 1708, and/or 1710 occur automatically (e.g., without human intervention) in response to completing 1702, 1704, 1706, and/or 1708, respectively. In some implementations of method 1700, the characteristic is at least one of noise or harshness. In some implementations, noise can be measured based on signal-to-noise ratio, noise figure, room mean square noise, total harmonic distortion, peak signal-to-noise ratio, and/or the like. In some implementations, harshness can be measured based on an amount of acceleration of the HMD and/or light generation device within a predetermined period of time.

In some implementations of method 1700, the light pattern is generated by the light generation device in an environment that is otherwise less than one-lux. In some implementations of method 1700, the light pattern is generated by the light generation device in an environment that has a spectral diversity (e.g., variation of frequencies) less than a predetermined threshold.

FIG. 18 illustrates a flowchart of a method 1800 to generate light patterns and capture motion data, according to an embodiment. In some implementations, method 1800 is stored as code in a memory (e.g., memory 122 of anchor 120) to be performed by a processor (e.g., processor 123 of anchor 120).

At 1802, a light pattern is caused to be generated within an interior of a vehicle via a plurality of light projectors (e.g., light projectors 124). In some implementations, the plurality of light projectors are included in a light generation device (e.g., anchor 120), and the light generation device includes an attachment configured to couple the light generation device to a surface of an interior of the vehicle. At 1804, motion data of the light generation device is sent to an HMD (e.g., HMD 110) that determines a pose associated with the HMD after receiving the motion data based on at least one of the motion data or image data (1) that is captured by the HMD and (2) that includes a representation of the light pattern. In some implementations, the light generation device includes a sensor (e.g., sensor(s) 121) configured to capture the motion data.

In some implementations of method 1800, 1804 occurs automatically (e.g., without human intervention) in response to completing 1802. In some implementations of method 1800, the light pattern is caused to be generated in an environment that has a light level that is less than one-lux and has a spectral diversity less than a predetermined threshold. In some implementations of method 1800, the light generation device is configured to be attached to the vehicle that has at least one of a vertical acceleration of the vehicle or a horizontal acceleration of the vehicle that is outside a predetermined acceptable range.

In some implementations of method 1800, the motion data that has noise outside a predetermined acceptable range is sent to the HMD that determines the pose associated with the HMD after receiving the motion data based on the image data and not the motion data. In some implementations of method 1800, the motion data that has noise within a predetermined acceptable range is sent to the HMD that determines the pose associated with the HMD after receiving the motion data based on the image data and the motion data.

All combinations of the foregoing concepts and additional concepts discussed herewithin (provided such concepts are not mutually inconsistent) are contemplated as being part of the subject matter disclosed herein. The terminology explicitly employed herein that also may appear in any disclosure incorporated by reference should be accorded a meaning most consistent with the particular concepts disclosed herein.

The drawings are primarily for illustrative purposes, and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

The entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments may be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments may not have been presented for a specific portion of the innovations or that further undescribed alternate embodiments may be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

The term “automatically” is used herein to modify actions that occur without direct input or prompting by an external source such as a user. Automatically occurring actions can occur periodically, sporadically, in response to a detected event (e.g., a user logging in), or according to a predetermined schedule.

The term “determining” encompasses a wide variety of actions and, therefore, “determining” can include calculating, computing, processing, deriving, investigating, looking up (e.g., looking up in a table, a database or another data structure), ascertaining and the like. Also, “determining” can include receiving (e.g., receiving information), accessing (e.g., accessing data in a memory) and the like. Also, “determining” can include resolving, selecting, choosing, establishing and the like.

The phrase “based on” does not mean “based only on,” unless expressly specified otherwise. In other words, the phrase “based on” describes both “based only on” and “based at least on.”

The term “processor” should be interpreted broadly to encompass a general purpose processor, a central processing unit (CPU), a microprocessor, a digital signal processor (DSP), a controller, a microcontroller, a state machine and so forth. Under some circumstances, a “processor” may refer to an application specific integrated circuit (ASIC), a programmable logic device (PLD), a field programmable gate array (FPGA), etc. The term “processor” may refer to a combination of processing devices, e.g., a combination of a DSP and a microprocessor, a plurality of microprocessors, one or more microprocessors in conjunction with a DSP core or any other such configuration.

The term “memory” should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms “instructions” and “code” should be interpreted broadly to include any type of computer-readable statement(s). For example, the terms “instructions” and “code” may refer to one or more programs, routines, sub-routines, functions, procedures, etc. “Instructions” and “code” may comprise a single computer-readable statement or many computer-readable statements.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts may be embodied as one or more methods, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

In addition, the disclosure may include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein may be implemented in a manner that enables a great deal of flexibility and customization as described herein.

All definitions, as defined and used herein, should be understood to control over dictionary definitions, definitions in documents incorporated by reference, and/or ordinary meanings of the defined terms.

As used herein, in particular embodiments, the terms "about" or "approximately" when preceding a numerical value indicates the value plus or minus a range of 10%. Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A head mounted display (HMD), comprising:
- a first sensor configured to capture motion data associated with the HMD when the HMD is worn by a user;
- a second sensor configured to capture image data that includes a representation of light patterns generated by a light generation device;
- a memory; and
- a processor operatively coupled to the first sensor, the second sensor, and the memory, the processor configured to:
  - receive motion data associated with the light generation device;
  - determine whether at least one of the motion data associated with the HMD or the motion data associated with the light generation device has noise outside a predetermined acceptable range;

in response to determining that the at least one of the motion data associated with the HMD or the motion data associated with the light generation device has noise outside the predetermined acceptable range, determine a head pose of the user (1) based on the image data, (2) not based on the motion data associated with the HMD and (3) not based on the motion data associated with the light generation device; and in response to determining that the at least one of the motion data associated with the HMD or the motion data associated with the light generation device has noise within the predetermined acceptable range, determine the head pose of the user based on the image data, the motion data associated with the HMD, and the motion data associated with the light generation device.

2. The HMD of claim 1, wherein the first sensor includes an inertial measurement unit and the second sensor includes a camera.

3. The HMD of claim 1, wherein determining the head pose of the user based on the image data, the motion data associated with the HMD, and the motion data associated with the light generation device includes:

modifying the motion data associated with the HMD based on the motion data associated with the light generation device to generate modified motion data, the head pose of the user determined based on the modified motion data.

4. The HMD of claim 1, wherein the motion data associated with the light generation device and the motion data associated with the HMD are unsynchronized.

5. The HMD of claim 1, wherein the light generation device is configured to generate the light patterns in an environment having a light level that is otherwise less than one-lux.

6. The HMD of claim 1, wherein the HMD and the light generation device are located inside a vehicle.

7. The HMD of claim 1, wherein the HMD and the light generation device are located inside a vehicle, the light generation device includes an attachment, and the light generation device is coupled to a surface of the vehicle via the attachment.

8. The HMD of claim 1, wherein the light generation device includes a plurality of light projectors configured to generate the light patterns that are projected in multiple directions onto multiple surfaces.

9. The HMD of claim 1, wherein the HMD and the light generation device are located inside a vehicle, and the light generation device is configured to generate the light patterns that are projected in multiple directions onto multiple surfaces of the vehicle.

10. The HMD of claim 1, further comprising:

a mirror coupled to the HMD and in a field of view of the second sensor, the image data captured by the second sensor via the mirror.

11. The HMD of claim 1, further comprising:

a mirror coupled to the HMD and in a field of view of the second sensor, the image data captured by the second sensor via the mirror, the mirror being configured such that the second sensor receives light (1) from a first surface not including an outside view and (2) not from a second surface including the outside view.

12. A method, comprising:

receiving, during a time period, motion data of a head mounted display (HMD);

receiving, from a light generation device, motion data of the light generation device during the time period;

receiving, during the time period, image data that includes a representation of a light pattern generated by the light generation device;

determining that a characteristic of at least one of the motion data of the HMD or the motion data of the light generation device is outside a predetermined acceptable range; and in response to determining that the characteristic of at least one of the motion data of the HMD or the motion data of the light generation device is outside the predetermined acceptable range, determining a pose associated with the HMD (1) based on the image data, (2) not based on the motion data of the HMD and (3) not based on the motion data of the light generation device.

13. The method of claim 12, wherein the characteristic is at least one of noise or harshness.

14. The method of claim 12, wherein the light pattern is generated by the light generation device in an environment that is otherwise less than one-lux.

15. The method of claim 12, wherein the light pattern is generated by the light generation device in an environment that has a spectral diversity less than a predetermined threshold.

16. A non-transitory, processor-readable medium storing instructions that, when executed by a processor, cause the processor to:

receive, during a time period, motion data of a head mounted display (HMD);

receive, from a light generation device, motion data of the light generation device during the time period;

receive, during the time period, image data that includes a representation of a light pattern generated by the light generation device;

determine that a characteristic of at least one of the motion data of the HMD or the motion data of the light generation device is outside a predetermined acceptable range; and in response to determining that the characteristic of at least one of the motion data of the HMD or the motion data of the light generation device is outside the predetermined acceptable range, determine a pose associated with the HMD (1) based on the image data, (2) not based on the motion data of the HMD and (3) not based on the motion data of the light generation device.

17. The non-transitory, processor-readable medium of claim 16, wherein the characteristic is at least one of noise or harshness.

18. The non-transitory, processor-readable medium of claim 16, wherein the light pattern is generated by the light generation device in an environment that is otherwise less than one-lux.

19. The non-transitory, processor-readable medium of claim 16, wherein the light pattern is generated by the light generation device in an environment that has a spectral diversity less than a predetermined threshold.

20. The non-transitory, processor-readable medium of claim 16, wherein the motion data of the light generation device is associated with a vehicle and includes at least one of a vertical acceleration of the vehicle or a horizontal acceleration of the vehicle.

* * * * *